(12) United States Patent
Yotsugi et al.

(10) Patent No.: US 6,881,148 B2
(45) Date of Patent: Apr. 19, 2005

(54) NET GAME SYSTEM, PROCESSING METHOD FOR PLAYING NET GAME, AND COMPUTER-READABLE STORAGE MEDIUM FOR STORING PROGRAM FOR PLAYING NET GAME

(75) Inventors: Hirotomo Yotsugi, Osaka (JP); Masatoshi Yamaoka, Sakai (JP); Satoko Naito, Sakai (JP); Norio Nakayama, Osaka (JP); Katsuhiro Goto, Neyagawa (JP); Kazuhiro Namba, Amagasaki (JP)

(73) Assignee: Konami Computer Entertainment Studios, Inc., Tokyo (JP)

( * ) Notice: Subject to any disclaimer, the term of this patent is extended or adjusted under 35 U.S.C. 154(b) by 129 days.

(21) Appl. No.: 10/007,732

(22) Filed: Nov. 8, 2001

(65) Prior Publication Data

US 2002/0055386 A1 May 9, 2002

(30) Foreign Application Priority Data

Nov. 9, 2000 (JP) ........................................ 2000-341367

(51) Int. Cl.[7] .......................... G06F 17/00; G06F 19/00
(52) U.S. Cl. ............................................. 463/42; 463/1
(58) Field of Search ................................ 463/40–42, 1; 434/107

(56) References Cited

U.S. PATENT DOCUMENTS

| | | | | |
|---|---|---|---|---|
| 5,894,556 A | * | 4/1999 | Grimm et al. | 709/227 |
| 5,964,660 A | * | 10/1999 | James et al. | 463/1 |
| 6,322,451 B1 | * | 11/2001 | Miura | 463/42 |
| 6,709,330 B1 | * | 3/2004 | Klein et al. | 463/9 |

FOREIGN PATENT DOCUMENTS

| | | | |
|---|---|---|---|
| EP | 1052588 A2 | * 5/2000 | ........... G06F/19/00 |
| EP | 1052588 | 11/2000 | |
| JP | 11-272754 | 10/1999 | |
| JP | 2000-322488 | 11/2000 | |
| JP | 2001-236409 | 8/2001 | |
| JP | 2002-7855 | 1/2002 | |
| JP | 2002-41980 | 2/2002 | |
| KR | 2002-0033352 | 5/2000 | |
| WO | WO 00/33272 | 6/2000 | |
| WO | WO0044458 | 8/2000 | |
| WO | WO 00/44458 | 3/2002 | |

OTHER PUBLICATIONS

The Sims. buy the Sims Mac in our simplest–shop.com. Jul. 25, 2000. Retrieved from the Internet on [May 29, 2003]. URL<http://www.simplest.shop.com/The,Sims,Mac,—1–468642–B00004TFJC–0–games–product.html>.*

(Continued)

*Primary Examiner*—Julie Brocketti
(74) *Attorney, Agent, or Firm*—Jordan and Hamburg LLP

(57) ABSTRACT

Network game system for playing a game with the aim of a achieving a predetermined goal. The game is played, via data terminals operated by member players, in a game space provided on a game server, while communicating with the game server on the network. The game server includes a recruiting information generating section for generating, upon receipt from a member player of referral information specifying the mail address of the data terminal of a non-member player, recruiting information including information specifying the member player, an enrollment processing section for performing enrollment processing upon receiving application information in response to recruiting information sent to the mail address of the non-member, and an advantage conferring section for conferring to the referring member player advantages useful in achieving the goal of the game.

18 Claims, 23 Drawing Sheets

OTHER PUBLICATIONS

"The Biggest Game Ever Closes in on Million Registered Users Needed to Begin" PR Newswire, New York. Jul. 26, 2000.*

Yoshida, Yoichi. "Princess Maker—Legend of Another Word—Raising a Daughter" 1995.*

"iwin.com Raises the Bar with $31 Million Daily Internet Lottery; extremelotto Become World's Richest Free Daily Lottery" PR Newswire; New York; Aug. 2, 2000.*

Walker, Mark H. The Video Game Almanac. Mars Publishing: Los Angeles CA. 2001. pp. 136 & 137.*

"New contents for a portable phone, "Band Age", "Keitai–President–aim at the president!" now producing for a deliverance", KCEO 00–2, Konami Computer Entertainment Osaka, [online], Sep. 19, 2000, Internet, <URL:http://www.konamiosa.com/jp/press/nr0009.*

"Net Kawara–ban", Nihon Kogyo Shinbun, Nihon Kogyo Shinbunsha, Nov. 18, 1998, p. 6.*

"Konami Official Guide perfect series, powerful professional baseball game 2000 in the real situation perfect guidance", Konami Kabushiki Kaisha, firstly published on Jun. 14, 2000, pp. 5,8,168–172,212–216,279,314–333.*

(1) "New contents for a portable phone, "Band Age", "Keitai–President–aim at the president!" now producing for a deliverance", KCEO 00–2, Konami Computer Entertainment Osaka, [online], Sep. 19, 2000, Internet, <URL: http://www.konamiosa.com/jp/press/nr000918.html>.

(2) "Net Kawara–ban", Nihon Kogyo Shinbun, Nihon Kogyo Shinbunsha, Nov. 18, 1998, p. 6.

(3) "Konami Official Guide perfect series, powerful professional baseball game 2000 in the real situation perfect guidance", Konami Kabushiki Kaisha, firstly published on Jun. 14, 2000, pp. 5, 8, 168–172, 212–216, 279, 314–333.

* cited by examiner

FIG.3

| | PARAMETER | DESCRIPTION | RANGE | REMARKS |
|---|---|---|---|---|
| 1 | NICKNAME | NAME IN GAME | TOTAL 8 CHARACTERS | REGISTER AT GAME START |
| 2 | SEX | PLAYER'S SEX | — | ♂/♀ |
| 3 | LEVEL | PLAYER'S CLEAR COUNT | 0~10 | PARAMETER RISES WITH LEVEL |
| 4 | DAYS | DAYS SINCE START OF GAME | 0~60 | |
| 5 | POSITION | CURRENT POSITION | — | |
| 6 | GOLD | CASH ON HAND | 0~ | |
| 7 | PHYSICAL STRENGTH | IF LOW, PARAMETER INCREASE DOWN (BASE IS 80) | 0~100 | INITIAL VALUE 100 |
| 8 | INTELLIGENCE | SMARTS RESOURCEFULNESS | 0~1000 | DETERMINED IN HEALTH CHECK (ABOUT 250) |
| 9 | CONDUCT | BEHAVIOR, JUDGEMENT | 0~1000 | DETERMINED IN HEALTH CHECK (ABOUT 250) |
| 10 | CHARM | INTERPERSONAL SKILLS, CHARM | 0~1000 | DETERMINED IN HEALTH CHECK (ABOUT 250) |
| 11 | FORTUNE | EASILY PASSES TESTS | 0~100 | DETERMINED RANDOMLY |
| 12 | TRUST | TRUST OF COMPANY WHEN PRESIDENT | 0~100 | INITIAL VALUE 100 (IF 0, BANKRUPTCY) |
| 13 | LOVE | IF HIGH, SOMETHING GOOD | 0~100 | INITIAL VALUE 50 |
| 14 | INDEPENDENCE | IF HIGH, OTHER PARAMETERS DO NOT RISE EASILY | 0~100 | INITIAL VALUE 0 |

FIG.4A

| | MODE | DESCRIPTION | CONTENT | PARAMETER INCREMENT/DECREMENT (FOR 1 QUESTION) | | | | | | |
|---|---|---|---|---|---|---|---|---|---|---|
| | | | | PS | I | C | CH | F | L | IND |
| 1 | WORK | WORK HARD | BUSINESS MANNERS (3 QUESTIONS) | -2~0 | 0 | +2~8 | 0 | 0 | -1 | -1 |
| 2 | GATHER INFORMATION | IMPROVE KNOWLEDGE | BUZZWORD QUIZ (3 QUESTIONS) | -1~0 | +2~8 | 0 | 0 | 0 | -1 | -1 |
| 3 | SOCIAL LIFE | LIVE WELL | RANDOM (1 QUESTION) | -4~2 | 0 | 0 | +2~8 | 0 | -3 | -1 |
| 4 | AFTER 5 | MAKE FRIENDS | — | +3~6 | -2~6 | -2~6 | +4~16 | 0 | +4~10 | +1 |
| 5 | REFRESH | EXCHANGE VIEWS | EXCHANGE MAIL | +1~3 | -1 | -1 | -1 | 0 | 0 | 0 |
| 6 | REFER FRIEND | INCREASE EMPLOYEES | — | +10% | +10% | +10% | +10% | +10% | +10% | +10% |

FIG.4B

| | CATEGORY | DESCRIPTION | PARAMETER INCREMENT/DECREMENT | | | | | | | REMARKS |
|---|---|---|---|---|---|---|---|---|---|---|
| | | | PS | I | C | CH | F | L | IND | |
| 1 | WORK | WORK HARD | -2~0 | 0 | +2~8 | 0 | 0 | -1 | +2 | SAME AS EMPLOYEE |
| 2 | GATHER INFORMATION | IMPROVE KNOWLEDGE | -1~0 | +2~8 | 0 | 0 | 0 | -1 | +2 | SAME AS EMPLOYEE |
| 3 | PROMOTE/ REMOTE | PROMOTE AND DEMOTE | -8 | -2 | +4 | -4 | -2~+2 | -20 | -10 | — |
| 4 | MEETING | CONVOKE EMPLOYEES | -4 | +2 | +4 | +2~4 | -2~+2 | 0 | +2 | EXCHANGE VIEWS WITH EMPLOYEES |
| 5 | AFTER 5 | MAKE FRIENDS | +3~6 | -2~6 | -2~6 | +4~16 | 0 | +4~10 | +1 | SAME AS EMPLOYEE |
| 6 | REFRESH | EXCHANGE VIEWS WITH FRIENDS | +1~3 | -1 | -1 | -1 | 0 | 0 | 0 | SAME AS EMPLOYEE |
| 7 | REFER FRIEND | INCREASE EMPLOYEES | +10% | +10% | +10% | +10% | +10% | +10% | +10% | SAME AS EMPLOYEE |

FIG.12
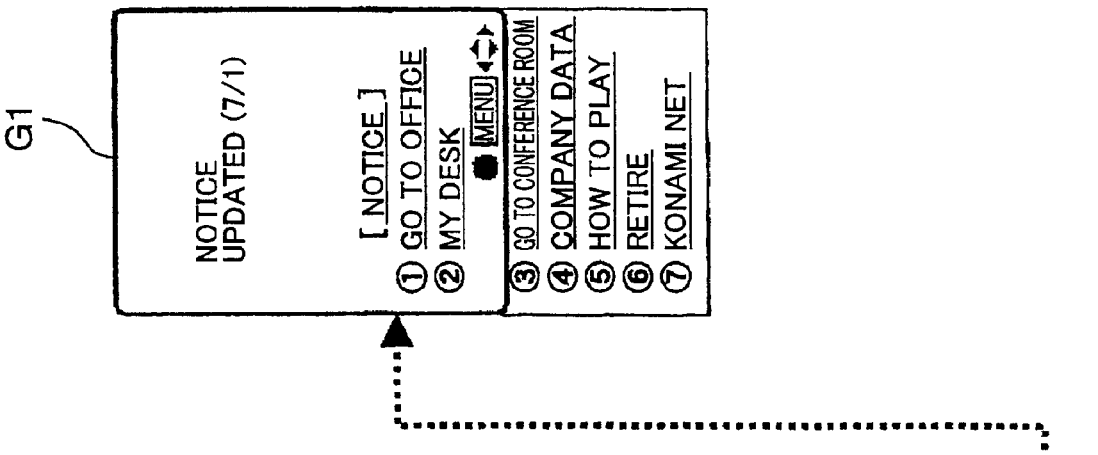
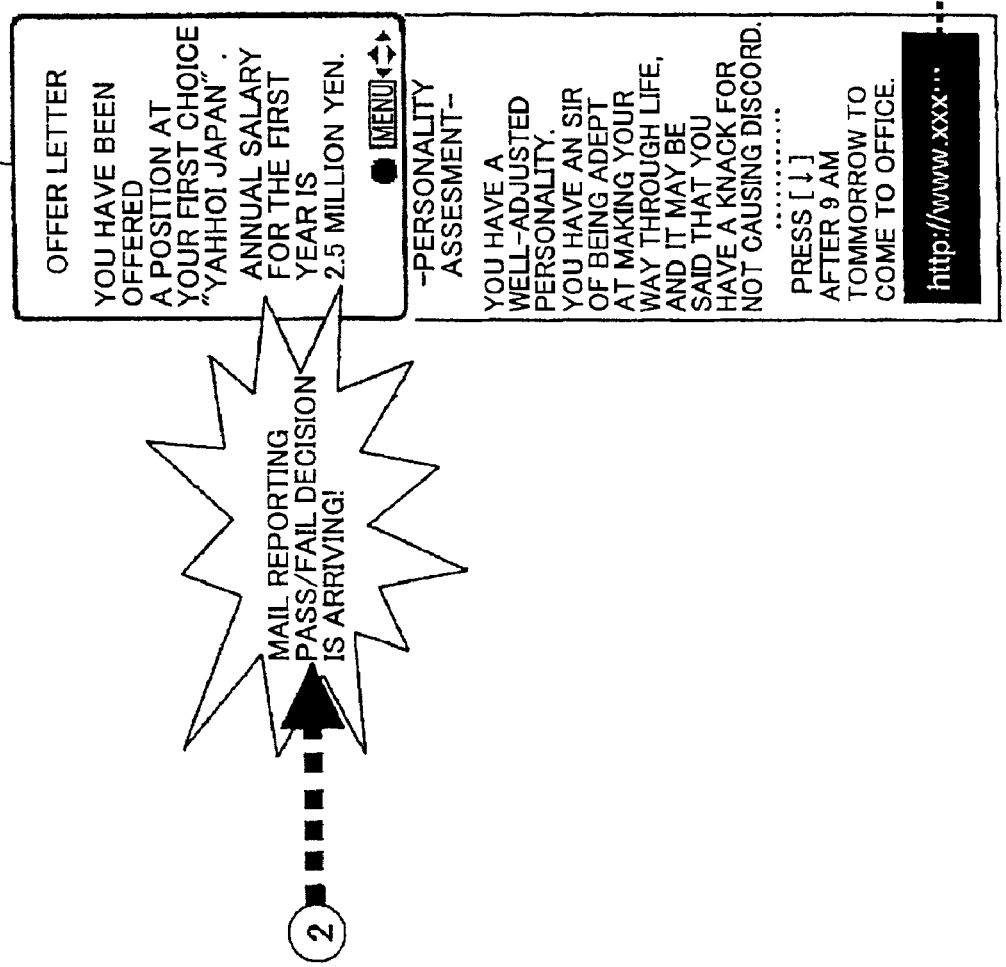

FIG.18

| | POSITION | CONDITION | TEST CONTENT |
|---|---|---|---|
| 1 | MANAGER | TOTAL OF AVG. OF INTELLIGECE AND CONDUCT + 10% FORTUNE ≧301 | QUESTIONS RELATING TO BUSINESS MANNERS, BUZZWORDS |
| 2 | CHIEF CLERK | TOTAL OF AVG. OF INTELLIGECE AND CONDUCT + 10% FORTUNE ≧351 | QUESTIONS RELATING TO BUSINESS MANNERS, BUZZWORDS |
| 3 | SECTION HEAD | TOTAL OF AVG. OF INTELLIGECE AND CONDUCT + 10% FORTUNE ≧401 (30% FOR CHIEF CLERK/SECTION HEAD TOGETHER) | QUESTIONS RELATING TO BUSINESS MANNERS, BUZZWORDS |
| 4 | DEPT. HEAD | TOTAL OF AVG. OF INTELLIGECE AND CONDUCT + 10% FORTUNE ≧451 (30% FOR CHIEF CLERK/SECTION HEAD TOGETHER) | QUESTIONS RELATING TO BUSINESS MANNERS, BUZZWORDS |
| 5 | MANAGING DIR. | TOTAL OF AVG. OF INTELLIGECE AND CONDUCT + 10% FORTUNE ≧511 (10% FOR MANAGING/EXEC. DIR. TOGETHER) | QUESTIONS RELATING TO MANAGEMENT (ANSWERS ARE RANDOM) |
| 6 | EXEC. DIR. | TOTAL OF AVG. OF INTELLIGECE AND CONDUCT + 10% FORTUNE ≧571 (10% FOR MANAGING/EXEC. DIR. TOGETHER) | QUESTIONS RELATING TO MANAGEMENT (ANSWERS ARE RANDOM) |
| 7 | PRES. | PARAMETERS HIGHER THAN CURRENT PRES. | SELECTED FROM EXECUTIVES, INCLUDING PRESIDENT |

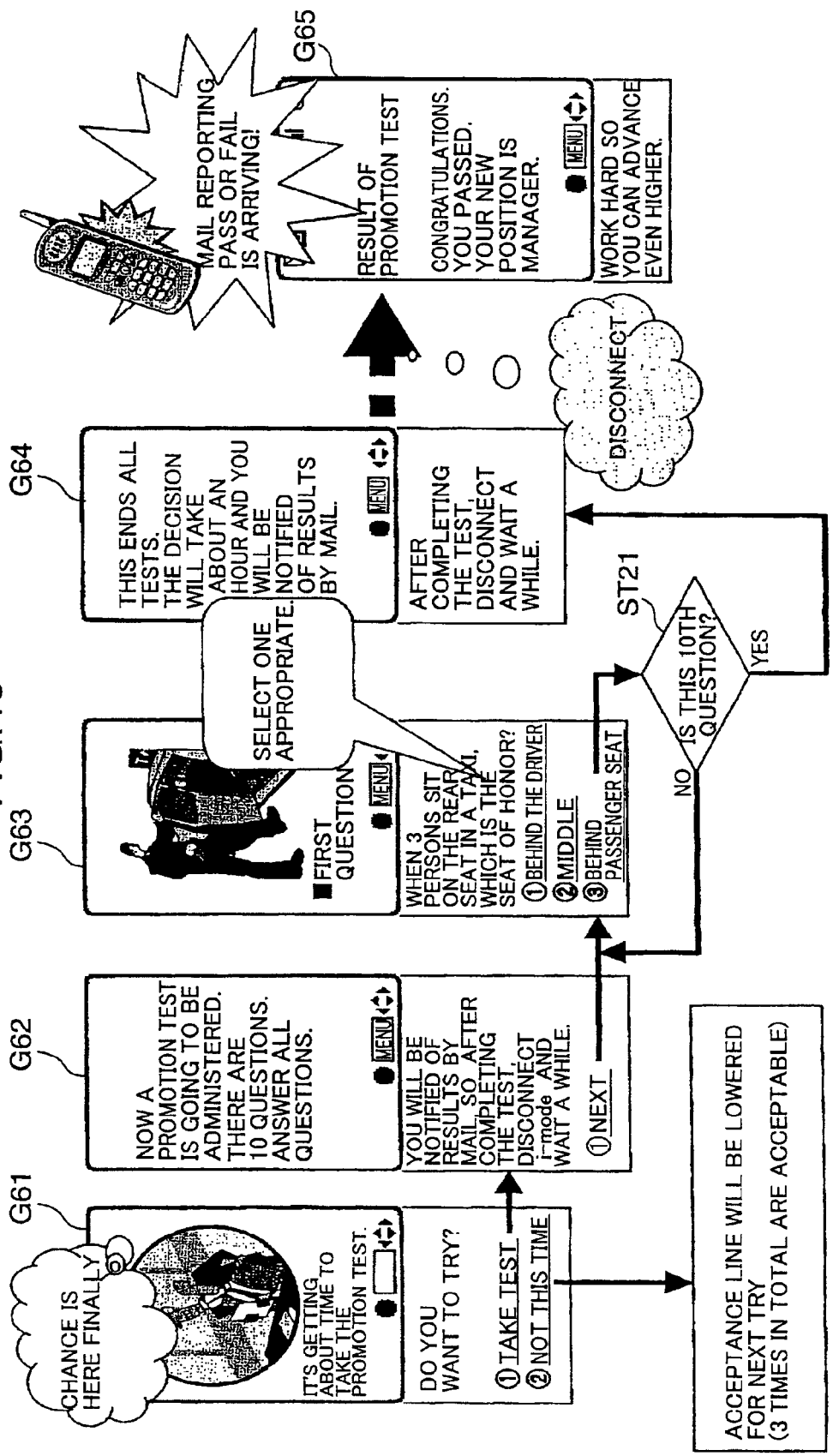

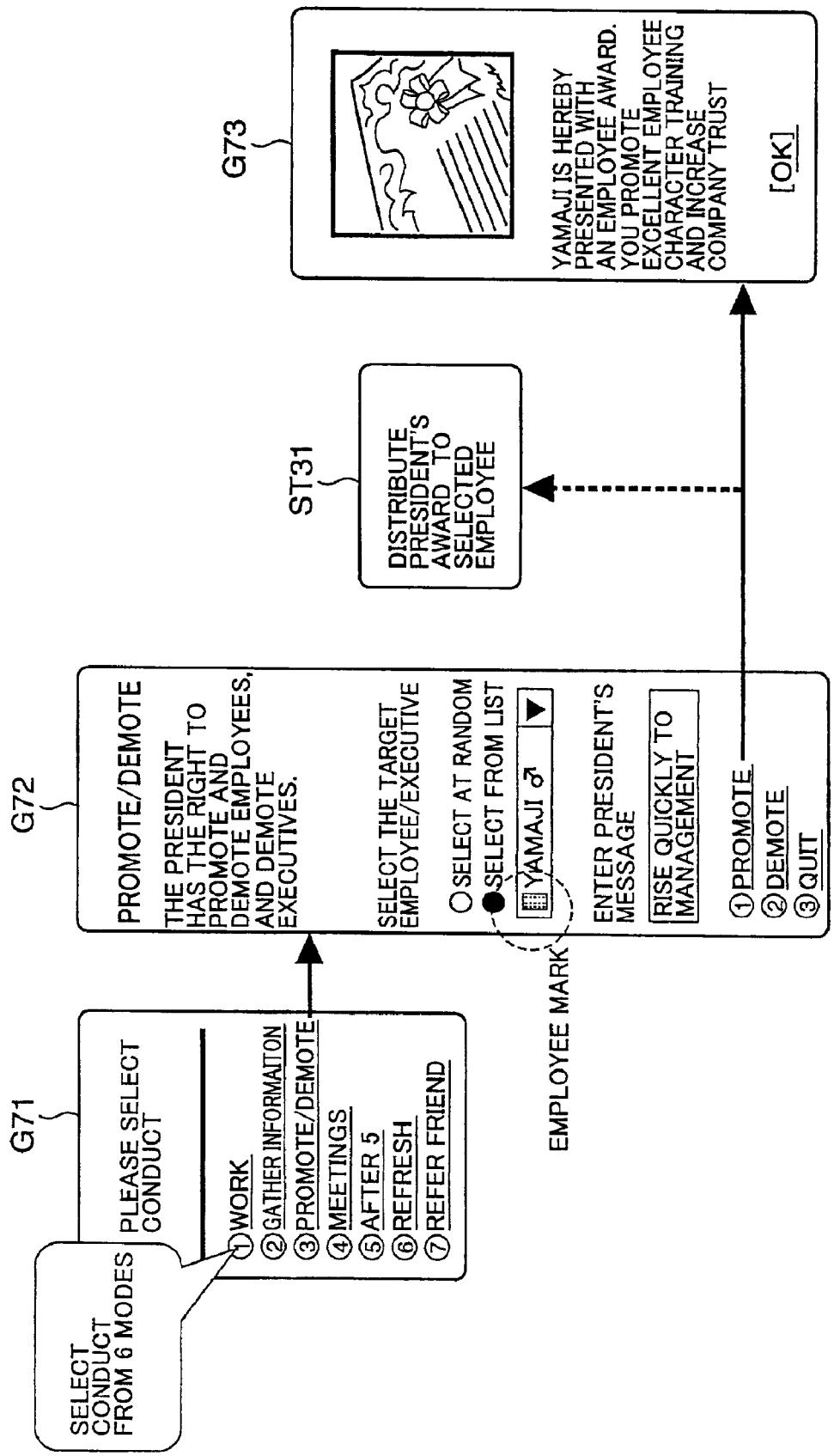

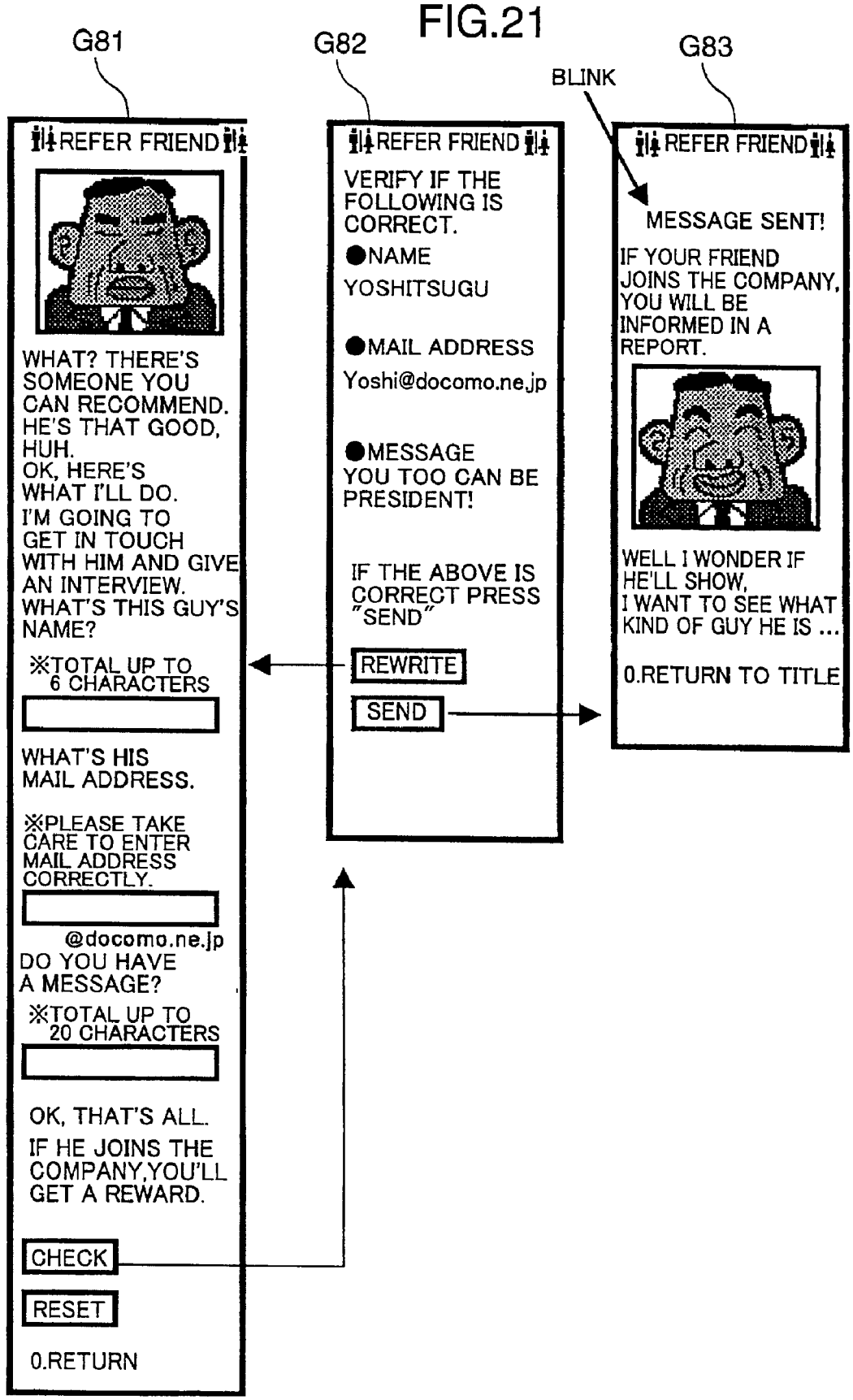

NET GAME SYSTEM, PROCESSING METHOD FOR PLAYING NET GAME, AND COMPUTER-READABLE STORAGE MEDIUM FOR STORING PROGRAM FOR PLAYING NET GAME

BACKGROUND OF THE INVENTION

1. Field of the Invention

The present invention relates to a game system technology whereby member players may play various games, including role-playing with the aim of achieving a set game goal, in a game space furnished on a server and accessible from players' data terminals via a network.

2. Description of the Related Art

To date, there are known in the art competitive games in which players use networkable data terminals (such as personal computers) to compete directly with one other or participate, via the network, in a same given stage in a sports, fighting or war game. In the area of role-playing games in which players assume roles of virtual actors in the game in order to participate in a virtual experience, there are also known character-training games, in which specific aptitudes of the players' virtual actors are improved through training and through competition with other virtual actors.

Also known are character-training games in which a number of aptitude parameters are set for each virtual actor, and players are posed various questions and prompted to respond and select selection branches; the skill parameters of a virtual actor associated with a player are modified in various ways depending on the appropriateness and content of these responses, to provide different character-training results among computer-controlled virtual actors.

In such games played over a network, game participants may be recruited, for example, by means of a game introduction page or the like accessible on a server, or by means of articles appearing in gaming magazines.

Conventional approaches that rely on a game introduction page or articles in gaming magazines have limited efficiency as a method for recruiting participants; particularly for games that are played most effectively with a large number of participants, the issue of how to recruit players is an important one.

SUMMARY OF THE INVENTION

With the foregoing in view, it is an object of the present invention to provide a net game system that, taking note of the fact that a game has a predetermined game goal, is intended to effectively increase the number of members by furnishing, by way of a means for achieving the goal of the game, a referral mode for recruiting non-members; a processing method for playing a net game; and a computer-readable storage medium for storing a program for playing a net game.

The invention relates to a net game system for playing a game with the aim of achieving a predetermined goal of the game, said game being played, via monitor-equipped data terminals operated by member players, in a game space provided on a game server, while in communication with the game server on a network, said system comprising: recruiting generating means for generating recruiting, said information including information specifying a member player, in the event that said game server receives from said member player referral information specifying the mail address of the data terminal of a non-member player; enrollment processing means for performing enrollment processing upon receiving job application information from said non-member player in response to recruiting information sent to the mail address of said non-member; and advantage conferring means for conferring to the referring member player advantages useful in achieving the goal of said game in the game.

According to the arrangement described hereinabove, monitor-equipped data terminals are operated by member players to communicate for the purpose of playing a game with the aim of achieving a predetermined goal of the game, on a game server located on the network, and in a game space provided on the game server. In one mode of the game, or in an additional mode, in the event that the game server is sent by a member player referral information specifying the mail address of the data terminal of a non-member player, the game server, upon receipt thereof, generates recruiting information including information specifying a member player, and sends the recruiting information to the mail address of the non-member. Upon receiving from the non-member job application information in response to the recruiting information, the game server performs enrollment processing. After completing enrollment processing, advantages useful in achieving the goal of the game in the game are conferred to the referring member player.

These and other objects, features, and advantages of the present invention will become more apparent upon reading of the following detailed description along with the accompanied drawings.

BRIEF DESCRIPTION OF THE DRAWINGS

FIG. 3 is a diagram of stored contents of personal data;

FIG. 4 is a table diagram of increment/decrement parameter value settings for different job duty modes, wherein (FIG. 4A) is a diagram of employee mode (job duties) and (FIG. 4B) is a diagram of president mode (job duties);

FIG. 12 is a screen shot for notification of an internal decision;

FIG. 18 is a table diagram of promotion condition scoring;

FIG. 19 is a screen shot of game play procedure during promotion testing;

FIG. 20 is a diagram showing a type of mode which is a management mode of a virtual company by a president, description thereof, and parameter increment/decrement ranges;

FIG. 21 is a diagram showing game play procedure in "refer friend" mode, one exemplary employee, president job duty mode;

DESCRIPTION OF THE PREFERRED EMBODIMENTS

Figure 1:
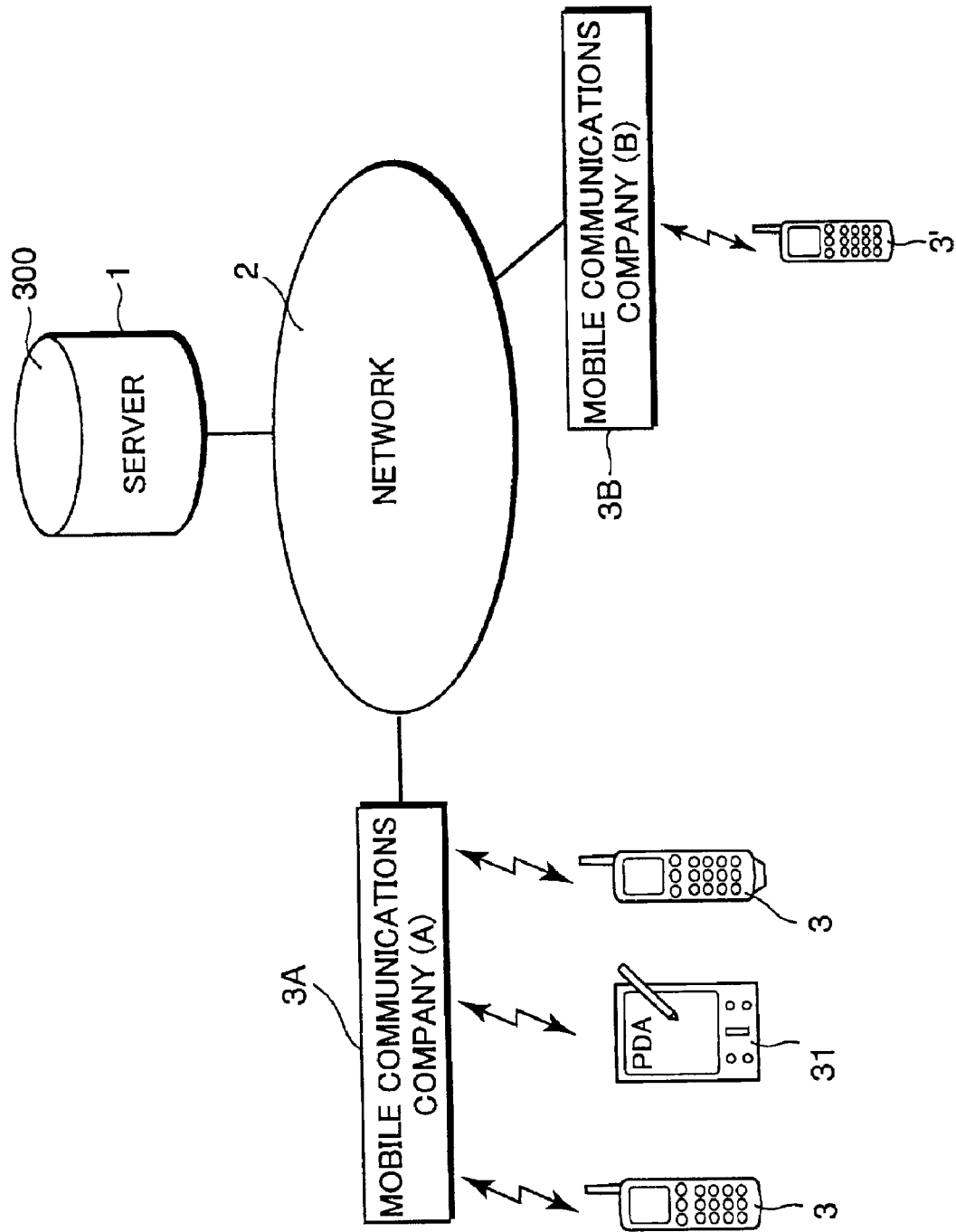
FIG. 1 is a system diagram of a character-training game system pertaining to the invention.

FIG. 1 is an overall schematic diagram of a character-training game system as an embodiment of the network game system of the invention. The server 1 for performing processing pertaining to the game is situated on a network 2, namely the Internet. A terminal device, namely, a cell phone 3 can communicate with server 1 by connecting to the network 2 via a provider 3A who is a contracting mobile communications company. In the present invention, formats by similar or different mobile communications companies may be employed.

Turning now to a description of the outline of the content of the character-training game, a game space established on server 1 and serving as a virtual "company" is accessed from the cell phones 3 of players who wish to participate in the game, and receives registration of virtual "employees" (virtual individuals). Server 1 for example periodically distributes a predetermined number of question sessions to cell phones 3 of virtual employees, i.e. players, and requests responses. Server 1 performs character-training processes, such as promoting and demoting virtual employees within the virtual company on the basis of the content of player responses. Depending on the content of responses to distributed questions, a virtual employees may advance to replace the current president—a virtual employee corresponding to another player.

Figure 2:
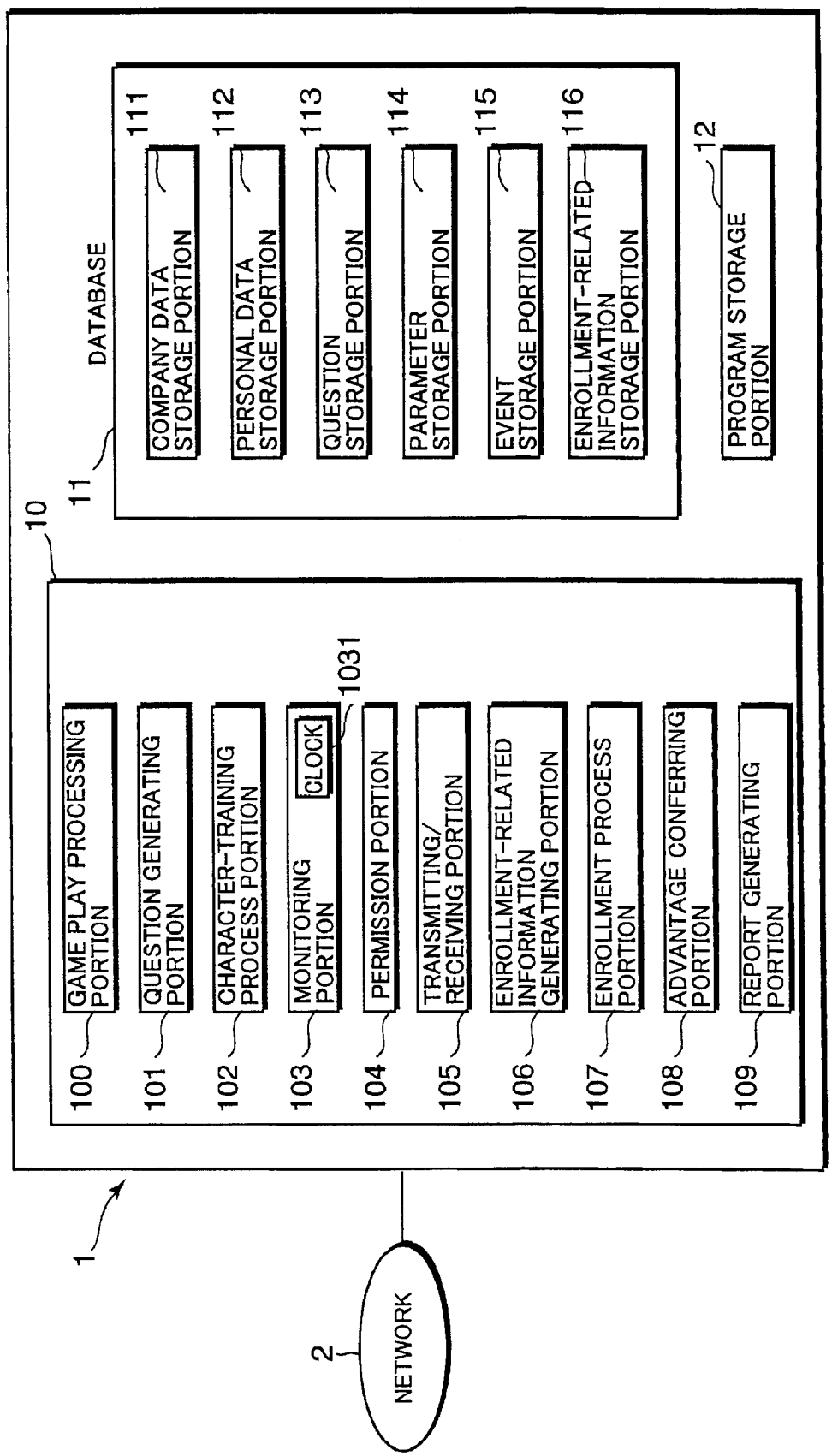
FIG. 2 is a block diagram of the server schematic.

FIG. 2 is a block diagram of the server schematic.

Server 1 comprises a control portion 10, which is composed of a microcomputer or the like for executing the game; a database portion 11 for storing various game data; and a program storage portion 12 for storing the control program of the character-training game.

Database portion 11 comprises a company data storage portion 111 for storing data relating to a virtual company; a personal data storage portion 112 for storing information relating to virtual individuals associated with players; a question storage portion 113 for storing various questions consisting of queries and question information in multiple choice format, etc. relating to interests and presented in a format that requests response from players; a parameter storage portion 114 for storing in table format parameter values set in association to responses (answers) to questions and incremented or decreased, scores (parameter values) for promotion conditions for various duties, and parameter values for company management modes indicating company management conditions after promotion to president; and an event storage portion 115 for storing various random event information, as well as a enrollment-related information storage portion 116 for storing referral guide information, recruitment information, standardized documents such as standard formats for reports, etc.

Company data storage portion 111 stores a plurality of virtual company data comprising various categories of business, and includes as virtual company data the name of the president, total assets, number of employees, as well as "star" ratings that indicate a popularity index and trust. Popularity index and trust are reflected in parameter values set at the time of enrollment and in increment/decrement parameter values.

Personal data storage portion 112 stores, for each virtual individual, information relating to a virtual individual, and set with reference to a the e-mail address of the player's cell phone 3 and the unique verifying ID of the cell phone 3, as shown in FIG. 3. The nickname shown in FIG. 3 is the name of the virtual individual associated with the player. Parameter attributes relating to character-training are "physical strength", "intelligence", "conduct", "charm", "fortune", "trust", "love" and "independence"; initial values are set depending on the results of the health check, etc., described later, performed as part of the enrollment process. Information such as "nickname" and "sex" is collected from the player during the enrollment process, and registered. Other stored personal information includes position, i.e., eight ranks ranging from ordinary employee to manager, chief clerk, section head, department head, managing director, executive director, and president; and current parameter values. A dedicated e-mail box for the game is assigned, for use in subsequent e-mail exchanges.

Question storage portion 113 stores questions presented to applicants during the admission test and questions posed to employees (including the president), from various standpoints relating to guide information specifying response method, etc.; stored problems prompt for response to question information relating to health and aptitude, question information relating to general knowledge (business manners, current buzzwords, etc.), and, optionally, question information in multiple choice format, etc. relating to hobbies and interests.

Parameter storage portion 114 is in the player-selectable, job duty-tabulated form shown in FIG. 4. Where attribute parameters for each job duty—"physical strength", "intelligence", conduct", "charm", "fortune", "love" and "independence"—match correct or predetermined responses to questions, cumulative increment/decrement parameter values are set. FIG. 4A shows the employee mode (job duties): "work", "gather information", "social life", "after 5", "refresh" "change jobs" and "refer friends". Where a virtual employee has the same type of cell phone 3 as the virtual current president (this can be determined from the unique verifying ID, etc.), this has the advantage that one extra parameter point is added. FIG. 4B shows the president mode (job duties): "work", "gather information", "promote/demote", "meeting", "after 5", "refresh" and "refer friend".

Event storage portion 115 stores information relating to "salary negotiation", "independence", "bankruptcy" and "special advancement".

Figure 22:
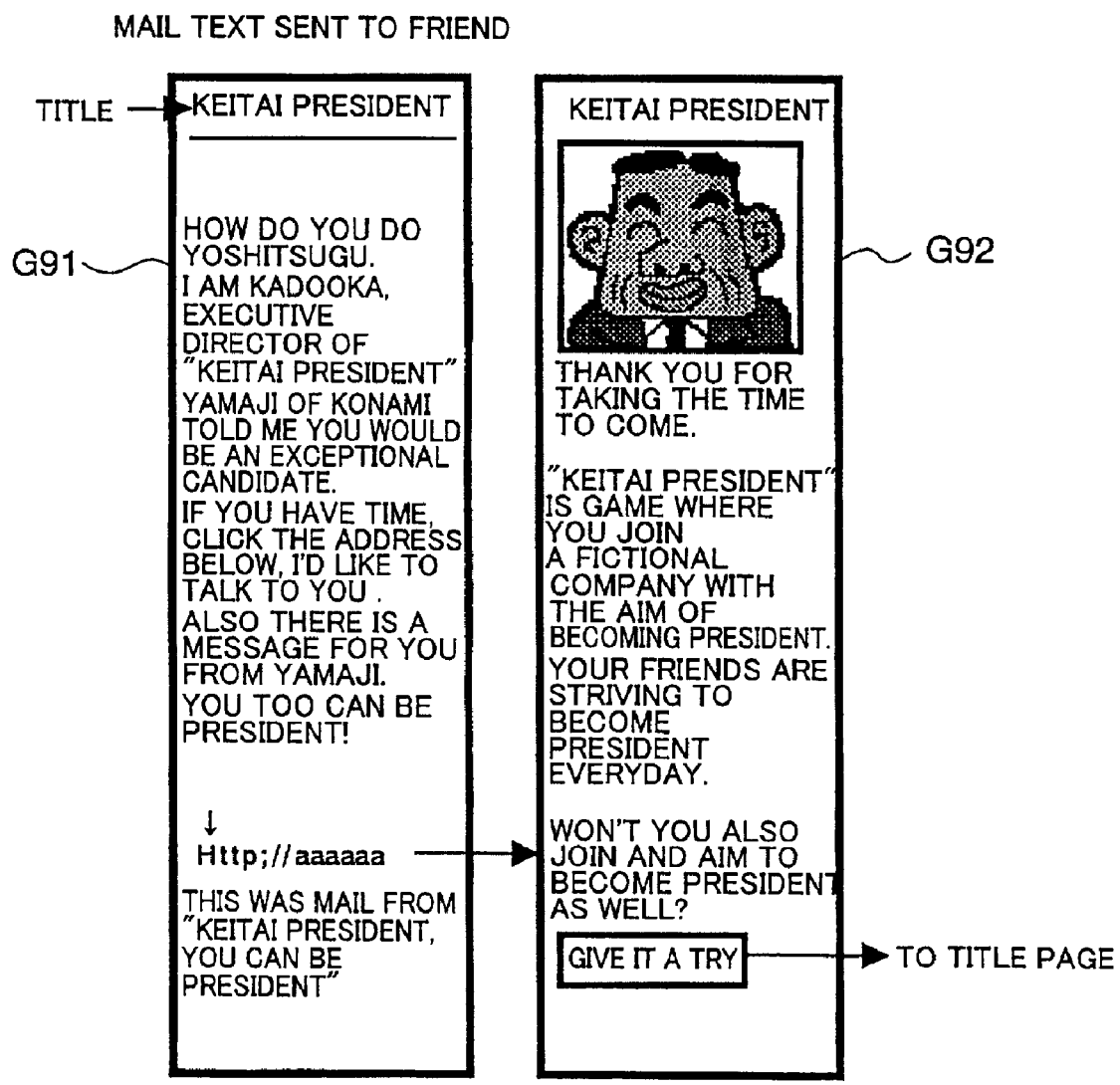
FIG. 22 is a diagram showing game play procedure for solicitation.
Figure 23:
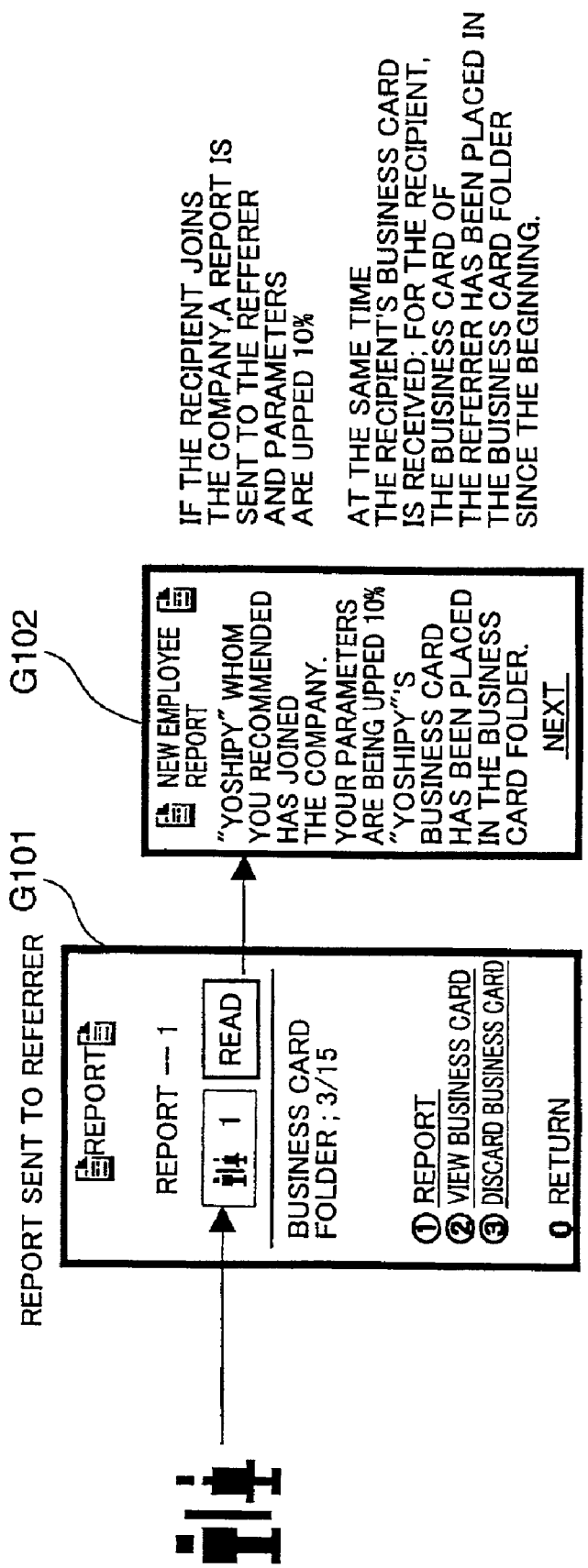
FIG. 23 is a diagram showing the procedure for notifying a referrer (player) that a friend has been hired.

Enrollment-related information storage portion 116 stores referral guide information and recruiting information, shown in FIGS. 21 and 22, as well as standardized documents such as standard formats for reports, etc., shown in FIG. 23.

Control portion 10 comprises a game play processing portion 100, a question generating portion 101, a character-training process portion 102, a monitoring portion 103, a permission portion 104, a transmitting/receiving portion 105, a enrollment-related information generating portion 106, a enrollment process portion 107, and a report generating portion 108.

Game play processing portion 100, in response to access from a cell phone 3, transmits an introductory game screen and displays a selectable menu. In response to a menu select operation and subsequent access by a player, it determines and manages the content of each access, as well as executing data management processes and display screen distribution processes in response to access content, on the basis of the game program.

Question generating portion 101 executes the necessary question generation processes at the time of enrollment (this may be of one type), and question generation processes after enrollment. Questions distributed after enrollment are generated through selection from among a multitude of questions according to a predetermined rule, or randomly. As post-enrollment question presentation is performed a plurality of times, in preferred practice, questions submitted to virtual individuals will be managed such that the same question is not distributed repeatedly to the same virtual individual, for example, by excluding previously submitted questions from the question selection process during the second and subsequent rounds. A question generated by question generating portion 101 is distributed upon access from a cell phone 3; a predetermined number of questions, for example one or three questions, are displayed in order in response to a single access.

Character-training process portion 102 receives a response to a question posed (submitted) to cell phone 3, receives a response to a question posed (submitted) at the enrollment decision and after hiring, and executes a process for adding increment/decrement parameter values to current parameter values, as well as determining whether the cumulative parameter values meet a predetermined condition. If the predetermined condition is met, a problem submission process for promotion is executed. In "refer friend" game mode, if the referral is successful, uniform values equal to 10% of the current parameter values shown in FIGS. 4A and 4B are calculated, and these values are added to current parameter values. The rate of increase is set to differ between FIGS. 4A and 4B.

Monitoring portion 103 has an internal clock function, and manages game play from a temporal standpoint. For example, if there is no access within a predetermined period of time, this is considered to be an unexcused absence, and if a series of unexcused absences should occur, a disciplinary process performed, followed by a termination process. The termination process is a process whereby, for example, data for the virtual individual in question is deleted from the personal data storage portion 122, etc. The invention may be implemented in similar fashion for a typical virtual organization other than a virtual company, with hiring and dismissal processes for hiring and dismissal being performed in a similar manner.

Permission portion 104 determines if a parameter acquired by a virtual individual has reached a promotion condition, or if a certain score—described later—for conferring the opportunity to succeed the current president has been reached, and if reached, instructs the question generating portion 101 to generate a question for promotion. The generated question is distributed to the cell phone 3 of the virtual individual by transmitting/receiving portion 105.

Transmitting/receiving portion 105 transmits to the question to be distributed and all other information to cell phone 3 via the network 2, as well as receiving access and response data from the cell phone 3 and transferring the data to a predetermined function portion.

Enrollment-related information generating portion 106 performs an input receiving process to a screen (see FIG. 21) for performing referral information input guidance that allows an existing employee to indicate a mail address for the data terminal of a non-employee, and a process for generating recruiting information (see FIG. 22) that includes information specifying the employee player. This recruiting information is transmitted to the cell phone 3 of the non-employee.

Enrollment process portion 107 performs a process for jumping to introductory screen G1 (see FIG. 8) when a solicitation is accepted, i.e. "wish to apply" is selected from the screen displayed on the m monitor of the non-employee's cell phone 3, shown in FIG. 22, and a process for informing the report generating portion 108 of the acceptance of the offer.

Advantage conferring portion 108 receives enrollment verification information from the enrollment process portion 107, and, by way of a useful advantage in achieving the goal of the game, performs a process to calculate uniform values equal to 10% of current parameter values and add these to current parameter values for the virtual individual who is the referring employee player.

Report generating portion 109 receives enrollment verification information from the enrollment process portion 107 and generates screen information, shown in FIG. 23, and transmits this to the referring player.

Figure 5:
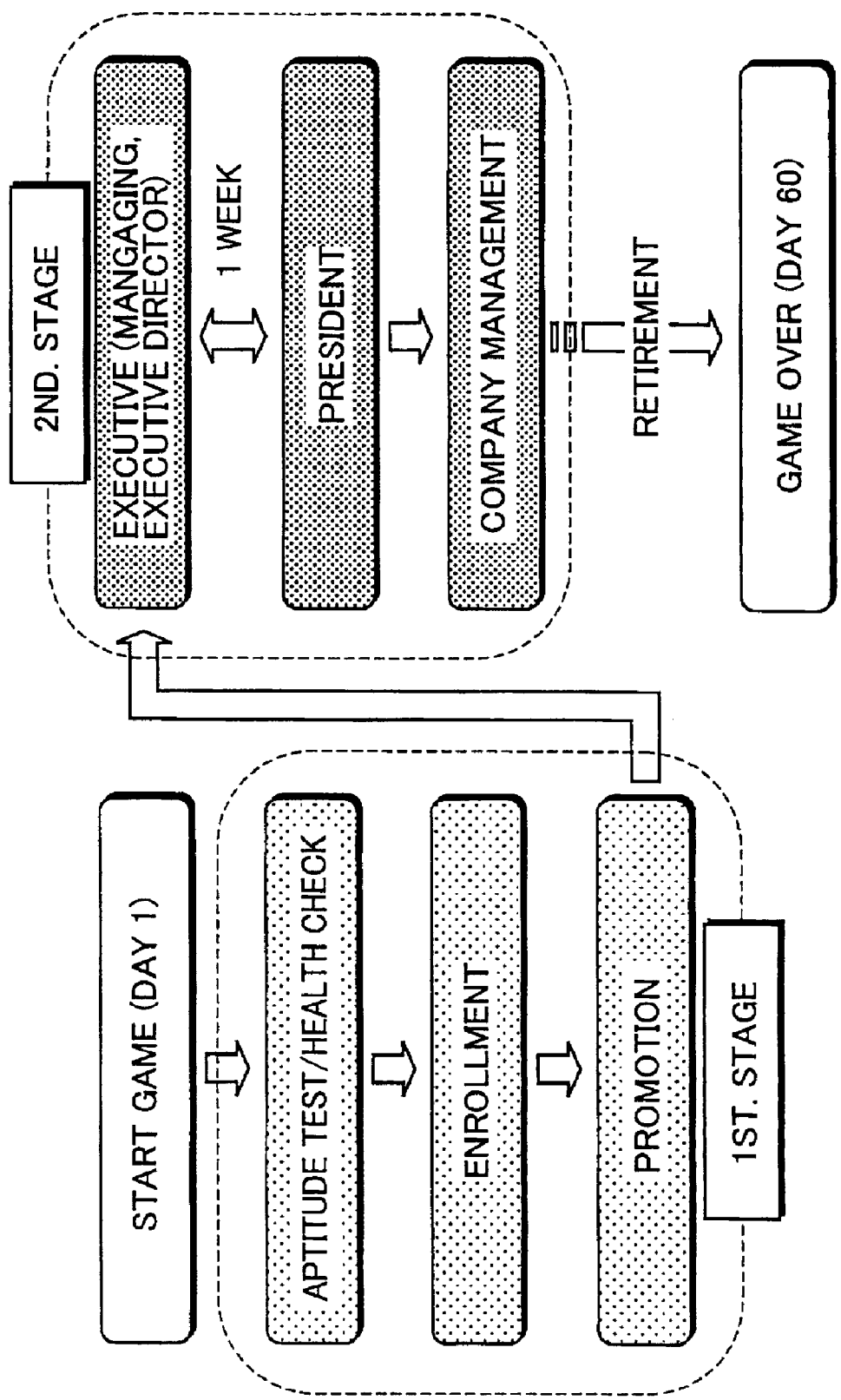
FIG. 5 is a diagram depicting game play from start to finish of the game.

FIG. 5 is a diagram depicting game play from start to finish of the game. Game play is time-managed within the virtual company; positions ranging from ordinary employee to department head, managing director, executive director, and president are set; and players retire on the 60th day after the game starts (i.e., typically the hire date), at which point the game ends. During this period, players aim to advance to president seven times. The game period is composed of a first stage—from enrollment to department head—and a second stage of advance from executive to president, and management of the company.

Figure 6:
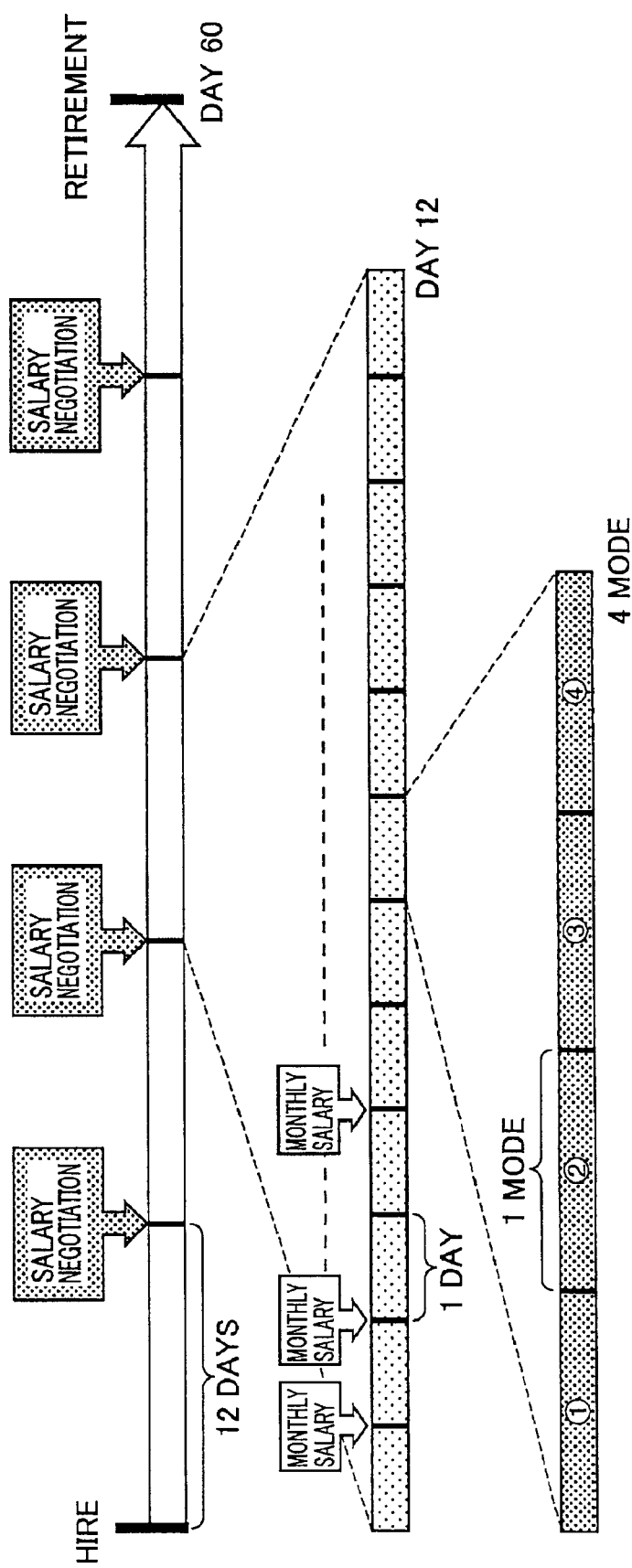
FIG. 6 is a diagram depicting temporal transitions from initial enrollment by a virtual company to retirement.

FIG. 6 is a diagram depicting temporal transitions from initial hiring by a virtual company to retirement. A 60-day period—the actual number of days from the hire date to retirement—corresponds to 5 years in virtual time. That is, during each virtual time of 1 year (actually 12 days), a salary negotiation event is provided by way of a random event. The first day of the game period corresponds to the first month of virtual time; in this game, to repeat a process corresponding to a mode (job duties), described later, four times a day is set as a condition for handling employment (job duty) history.

Figure 7:
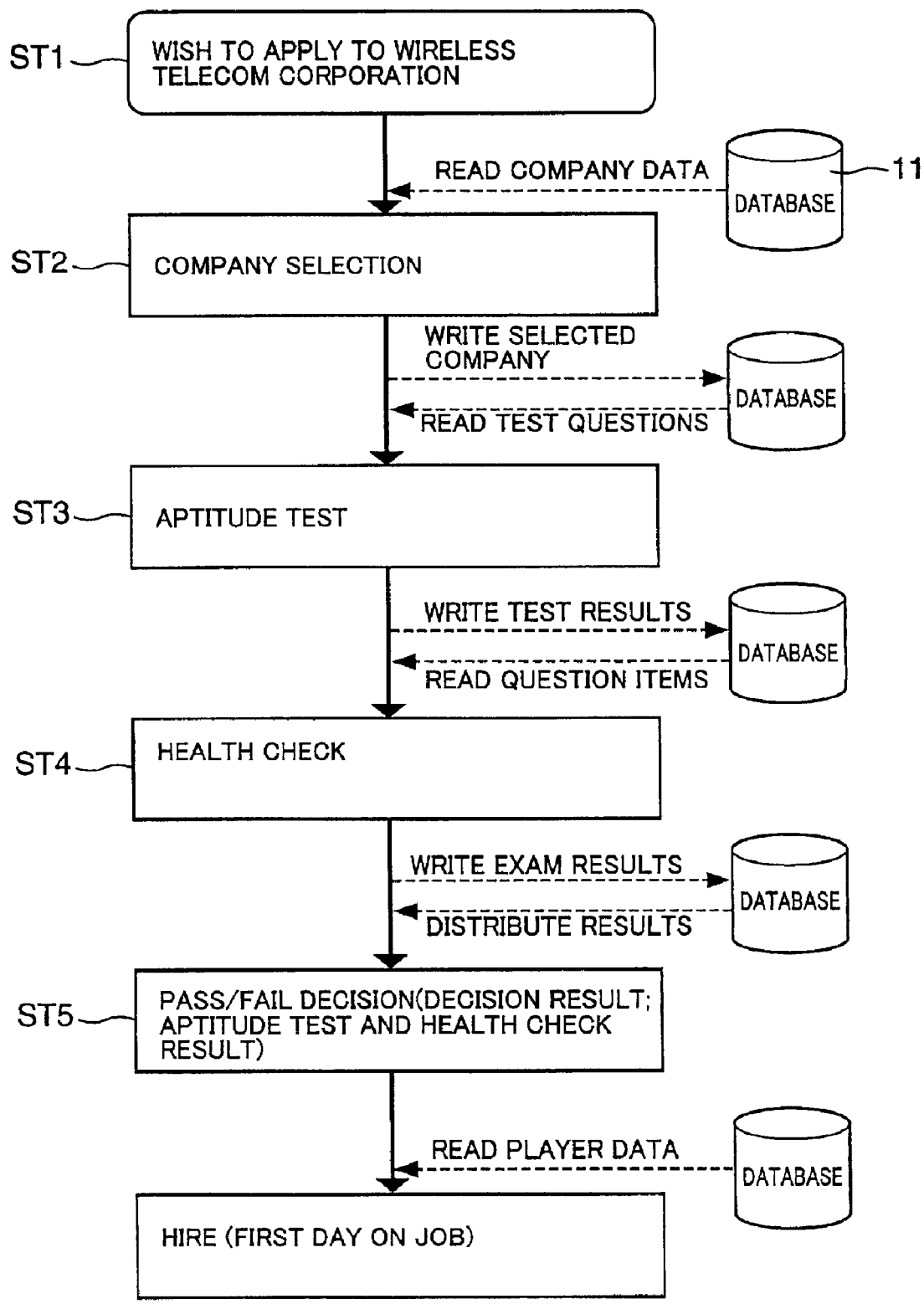
FIG. 7 is a flow chart showing the process from the start of the game to enrollment by a virtual company.
Figure 8:
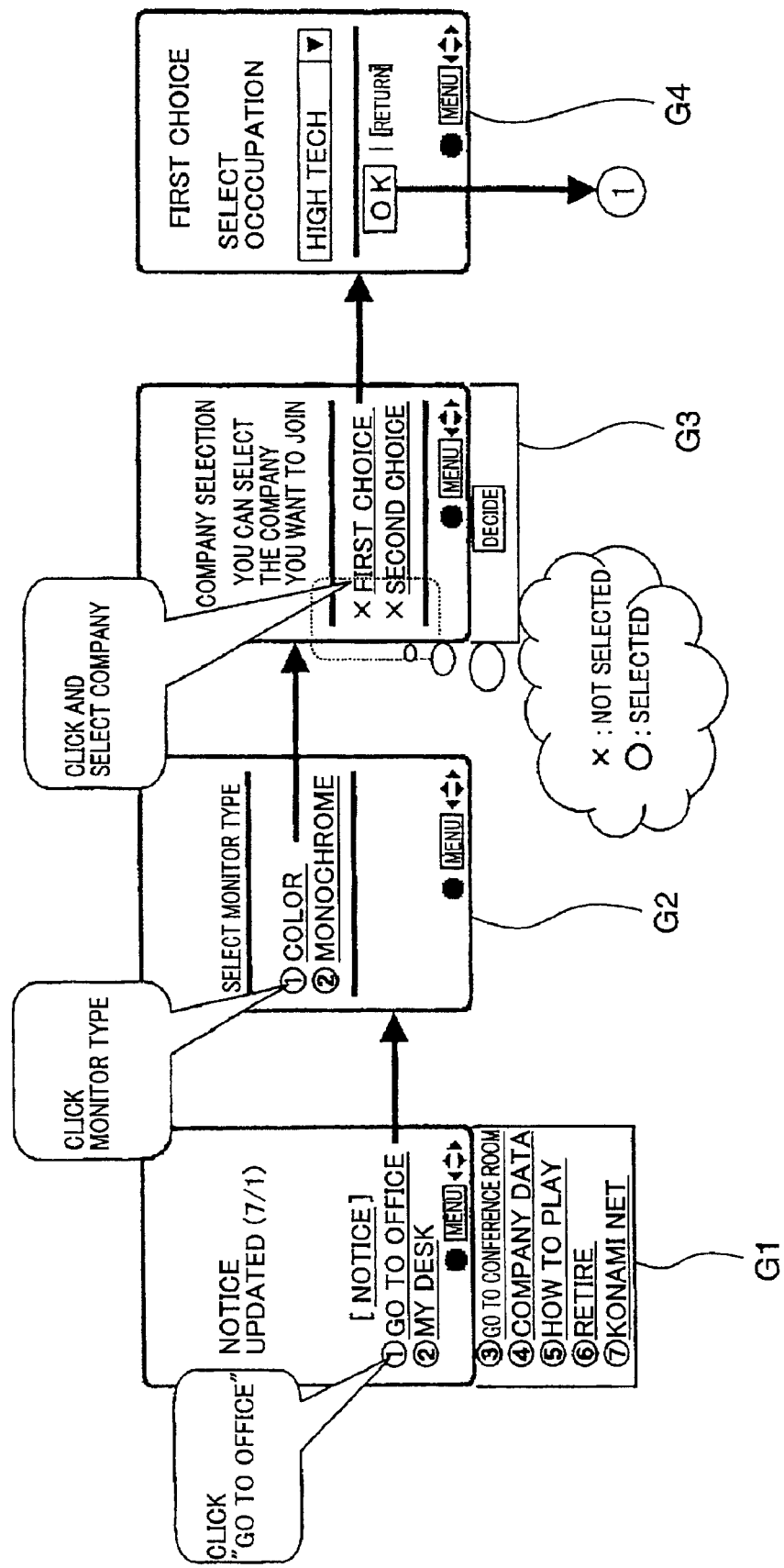
FIG. 8 is a screen shot of the process for seeking employment.
Figure 9:
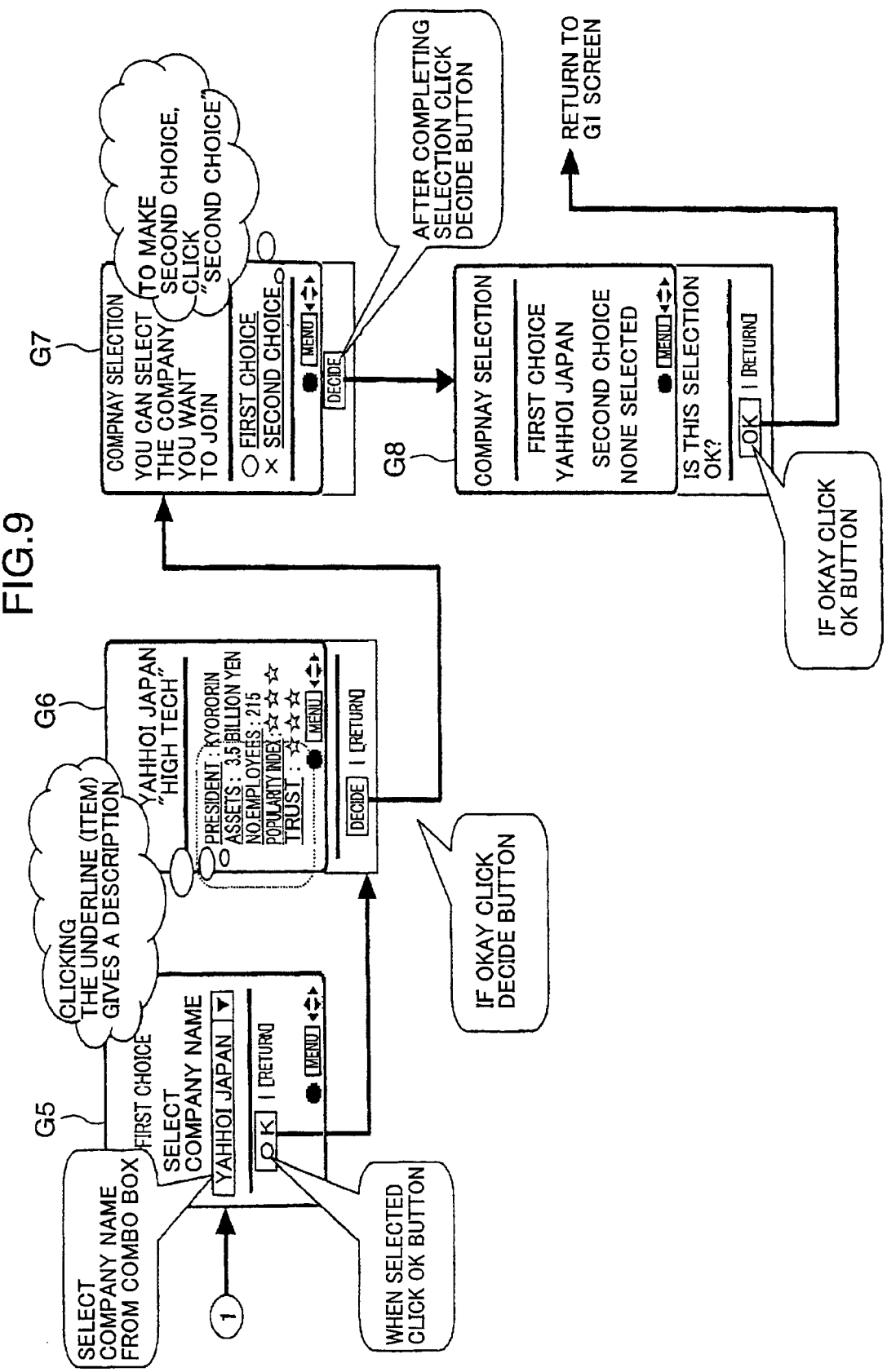
FIG. 9 is a screen shot of the process for seeking employment.

FIG. 7 is a flow chart showing the process from the start of the game to hiring by a virtual company. FIGS. 8 and 9 are screens at points in time. When a new player accesses the server 1 (STEP ST1), the introductory screen G1 shown in FIG. 8 is displayed. This introductory screen G1 shows the game title and communication items, below which is displayed selection branches of links to other pages. All players begin the game from this introductory screen G1. The new player selects "go to office". The game play processing portion 100 searches registered unique verifying IDs to determine whether the unique verifying ID of the accessing cell phone 3 is present in the personal data storage portion 112, and if the unique verifying ID is not present in the database 210, it treats the player as a new player.

Next, in order to register the monitor of the player's cell phone 3 as being color display-capable or monochrome, a question screen G2 is displayed to prompt the new player for a response. The content of the response is stored in personal data storage portion 112, as information appended to the unique verifying ID of the player's cell phone 3, and subsequently, display information transmitted from server 1 to this cell phone 3 is transmitted as color information in the registered format.

Next, game play processing portion 100 reads virtual company data registered in the company data storage portion 111, as well as transmitting a virtual company selection screen G3 for display on the monitor of cell phone 3, in order to prompt the player to select a first choice and a second choice of a virtual company to apply to (STEP ST2). Prior to selecting virtual companies, a desired occupation input screen G4 is displayed; pulling down the menu and inputting the title of the occupation from the displayed occupation enables display, at the player's request, of a list of virtual companies, for reference in virtual company selection, to prompt the player to select a desired company from the list. After making the selection from the selected screen G5, a description of the virtual company is displayed. As shown on screen G6, the displayed description includes the name of the president, capital (president's assets), number of employees, and a popularity index. If desired, a second choice for virtual company to apply to can be selected as shown in screen G7.

After selecting the desired virtual company(s), if only a first choice has been made, the system returns to the introductory screen G1 when, for example, "OK" is indicated from the confirmation screen G8.

Figure 10:
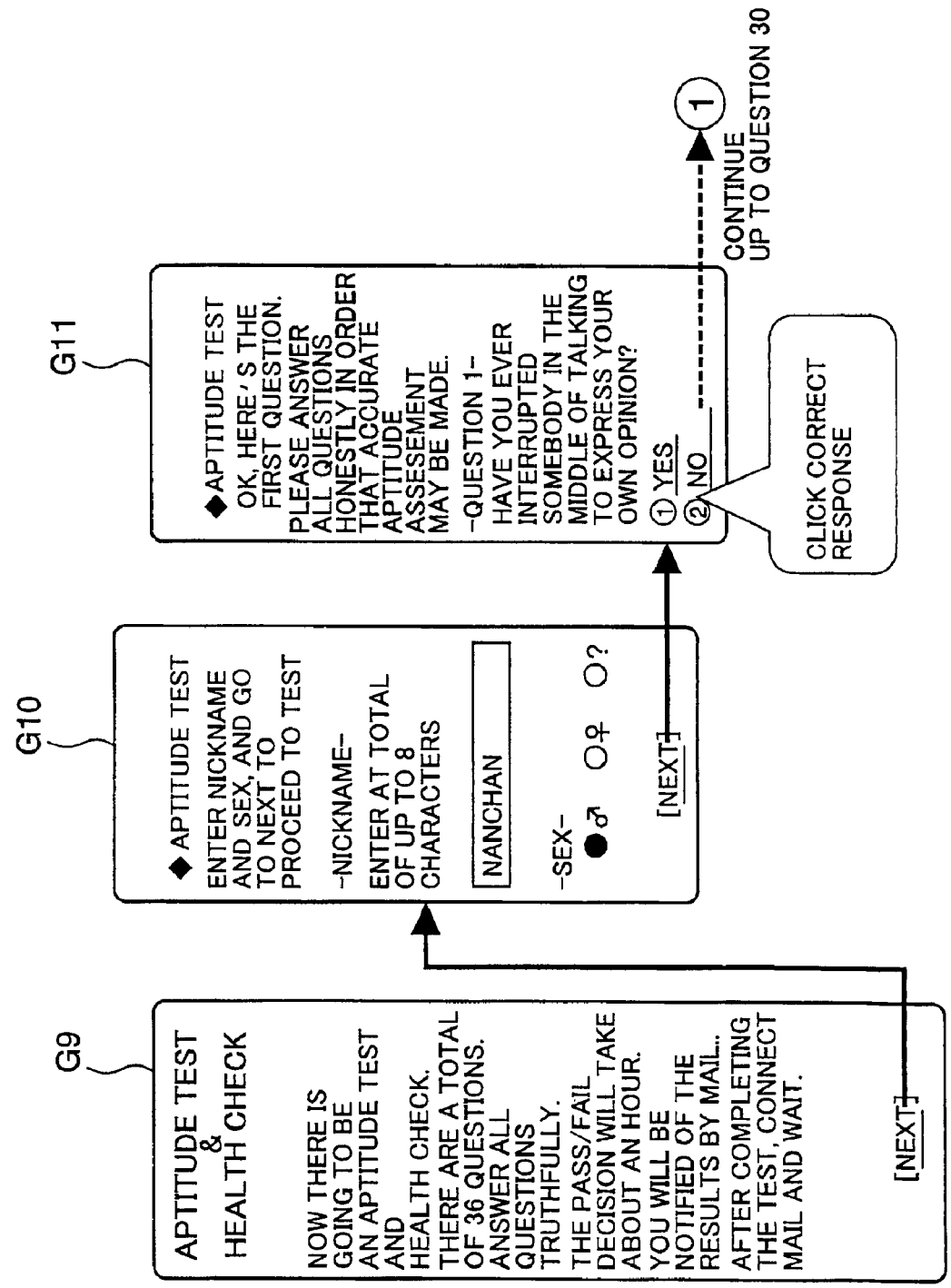
FIG. 10 is a screen shot of the core procedure when "go to office" is selected.

Next, if "go to office" is selected, a screen G9 notifying the start of an employment aptitude test, shown in FIG. 10, is displayed, and under operation by the player proceeds to a screen G10 having entry fields to prompt entry of the virtual individual's nickname and entry of sex and selection in the entry fields on the screen. When the required entries have been completed, it moves to screen G11, where a true-or-false selection format question is displayed and response is prompted. A predetermined number of selection format questions—for example, 30 questions—are given. When responses to all questions have been completed, the contents of the responses are sent back to the server 1 and captured by the game play processing portion 100. Next, questions to be given in a health check (STEP ST4) are transmitted to cell phone 3, and proceeds to the health check.

Figure 11:
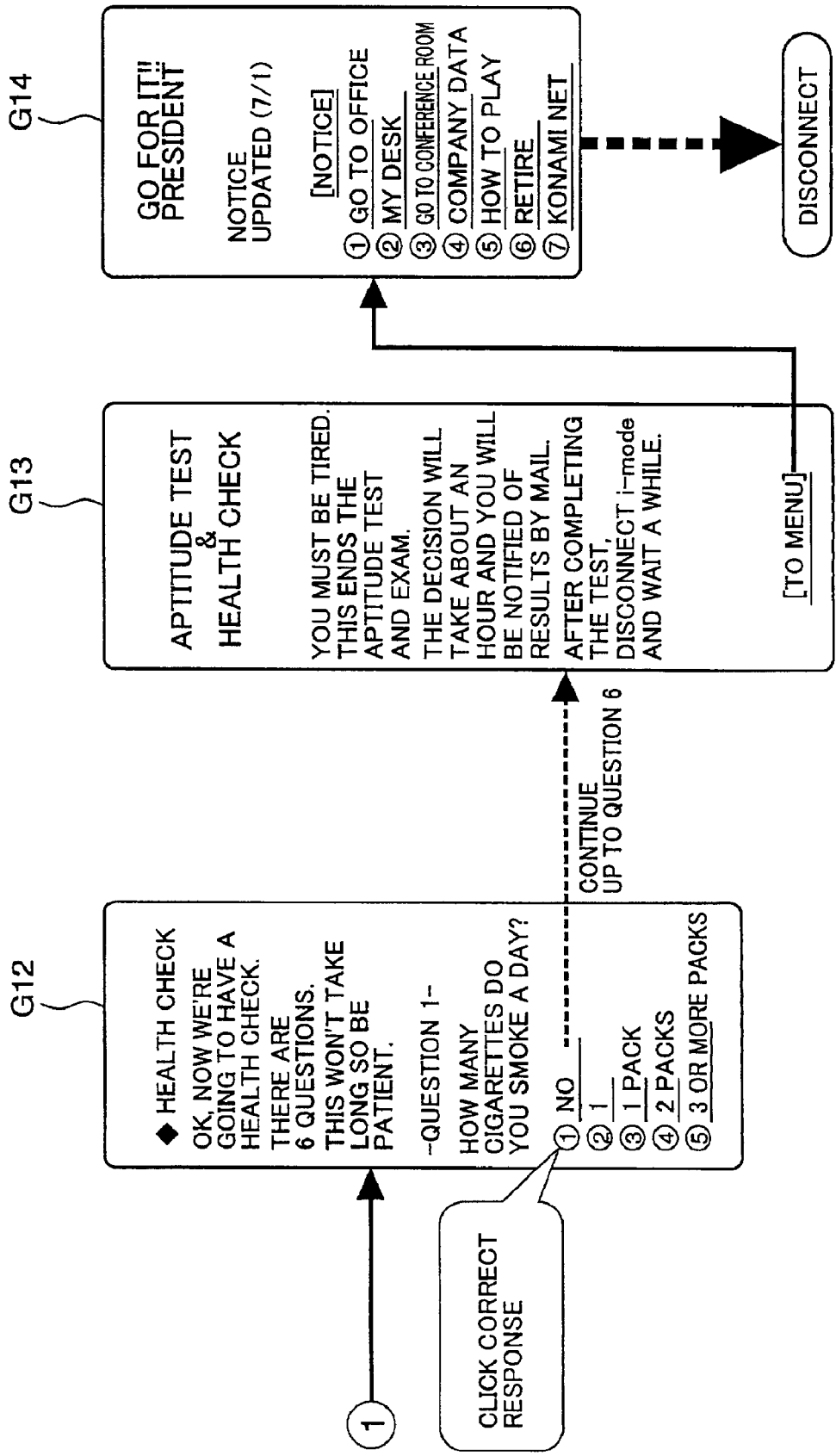
FIG. 11 is a game screen shot of the procedure.

FIG. 11 is a game screen shot of the health check procedure. The health check is conducted in multiple choice format, and a screen G12 of content consistent with a typical health check is displayed; in the present embodiment, 6 questions are given. Upon completion, the content of the responses to the questions are captured by the game play processing portion 100, after which a final screen G13 is displayed, followed by return to introductory screen G1, at which point the connection is terminated. The character-training process portion 102 then performs an evaluation of aptitude, performs a hiring decision (decision result, aptitude, exam results), and distributes the results in an e-mail to the cell phone 3 of the player (STEP ST5).

As for FIG. 12, if the decision is to hire, content simulating an internal decision and an annual salary are displayed on a screen G14 showing an internal decision, a character decision result and employee manual are provided, and personal information previously entered by the player is taken from primary memory and placed in personal data storage portion 112 for personnel purposes.

Figure 13:
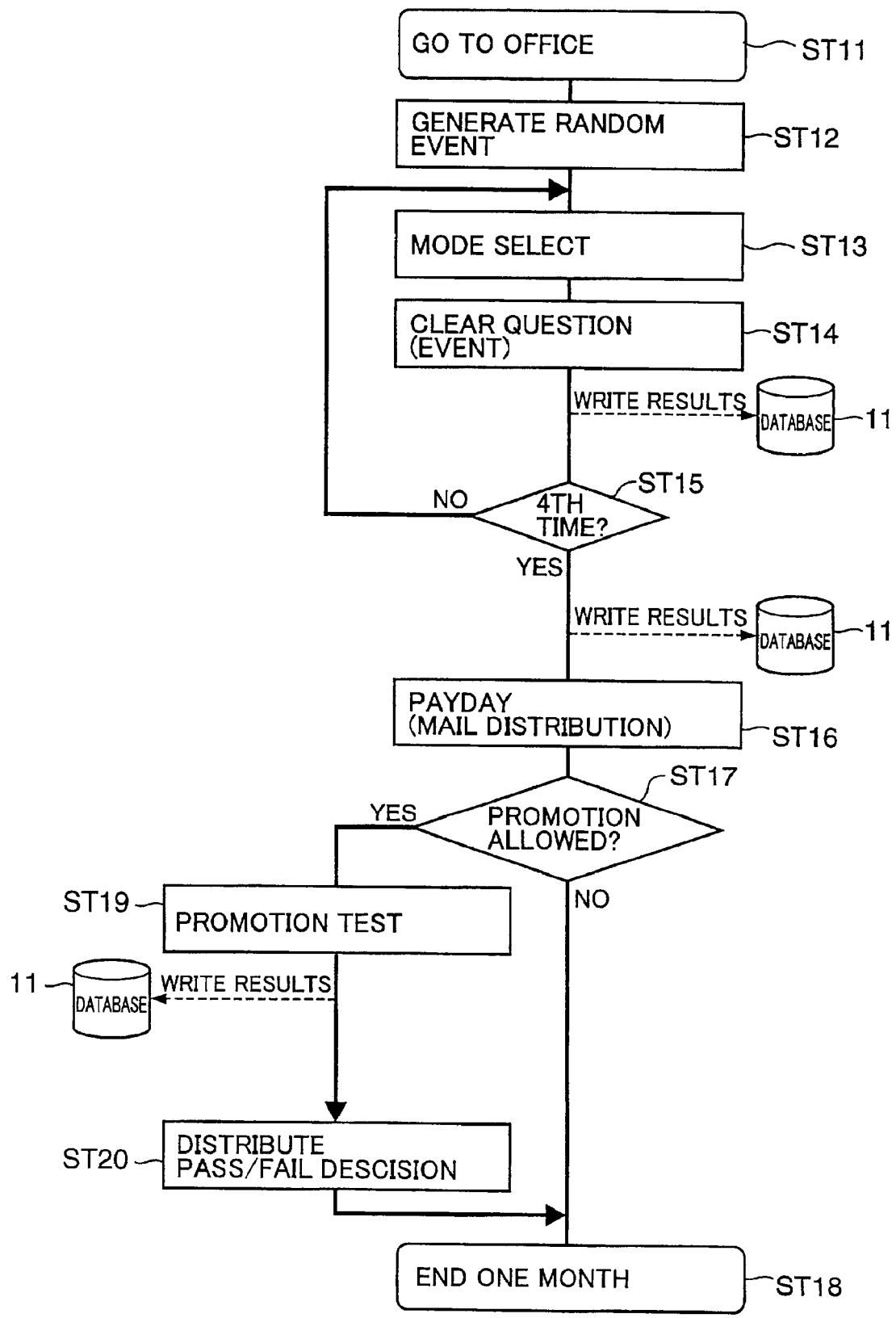
FIG. 13 is a diagram depicting the processing steps for performing among players for duties of a virtual one-month period (actually one day) of a virtual individual who is an employee at a virtual company.

FIG. 13 is a diagram depicting the processing steps for performing among players for duties of a virtual one-month period (actually one day) of a virtual individual who is an employee at a virtual company.

When the player accesses server 1 from his cell phone 3 (STEP ST11) he is considered to have begun employment (normal duties) at the virtual company. The monitoring portion 103 uses an internal clock 1031 to monitor on a daily basis whether there has been access from the virtual individual. If there has been no access for four consecutive days, an e-mail urging the employee to show up for work is sent to the virtual individual, and if it is confirmed that there has been no access for a subsequent three consecutive days, information relating to the virtual individual is deleted from the personal data storage portion 112, i.e. his standing as an employee of the virtual company is revoked. At this time, character-training process portion 102 may perform a process to decrement predetermined parameter values by predetermined values.

If, on the other hand, there is access from the player, the question generating portion 101, if a certain condition (described later) has been met, sets a random event, and transmits the content thereof from the transmitting/receiving portion 105 to the player's cell phone 3 (STEP ST12). That is, every five days starting from the hire date, a "salary negotiation" event is generated, in the event that the "independence" parameter has reached 100, a "go independent" event may be randomly generated, in the event that "trust" parameter of the president has reached 0, a "bankruptcy" event is generated, and for employees whose parameters are low relative to the number of days elapsed since the hire date, a "special advancement" event is generated with high probability. A "special advancement" event randomly promotes an employee to a position at least two ranks or more higher, and changes parameter values to reflect the higher position.

Turning now to a description of the various random events, in "salary negotiation" event, there is displayed an input screen the includes the screens "OK", "further negotiation" and "resolve"; if "further negotiation" is selected, an amount may be entered in the Desired Amount field. This event is resolved within a range of ±20% of the offered amount; the resolution factor depends on the magnitude of the "fortune" and "love" parameters.

In an "go independent" event a document indicating going independent is displayed; selecting "Next" is considered as going independent, whereupon a select occupation field, a company name entry field, and a select properties field are displayed. The desired contents can be selected and entered and when "next" is selected, there is displayed a screen showing one becoming the first president of a company. By this process, a new virtual company is generated and registered in the company data storage 111, and data for the virtual individual in the personal data storage portion 112 is recorded (transferred) as the president of the newly established virtual company. After transfer, data for the virtual individual in the personal data storage portion 112 is deleted. In this system, the number of virtual companies may be limited to a predetermined number, such as 50, for example. In this case, going independent will be enabled on a first-come basis.

The game play processing portion 100 can display a list of newly established virtual companies to players seeking employment in the manner noted above. For a predetermined period of time after a company is set up, a startup firm mark or the like—functioning as a sort of "now hiring"

mode—may be displayed as well. From the standpoint of proper play of the game, the game play processing portion 100 monitors whether a predetermined number of employees have joined the within a predetermined time interval, and if it is less than this predetermined number, it is judged to be a failed venture. The cell phone 3 of the president of the virtual company is notified of this fact, and the virtual company registration data is deleted from the company data storage portion 111.

In a "bankruptcy" event, the employing virtual company is merged with another virtual company, at which point in time the game is over for the player serving as president. Employees of the bankrupt virtual company assume positions that are lower by one rank, and parameters are lowered to reflect this.

With any type of random event, once the event is completed the system moves to a mode select screen (STEP S13). The question generating portion 101 generates a question appropriate for the selected mode, which is displayed on the cell phone 3 monitor.

Figure 14:
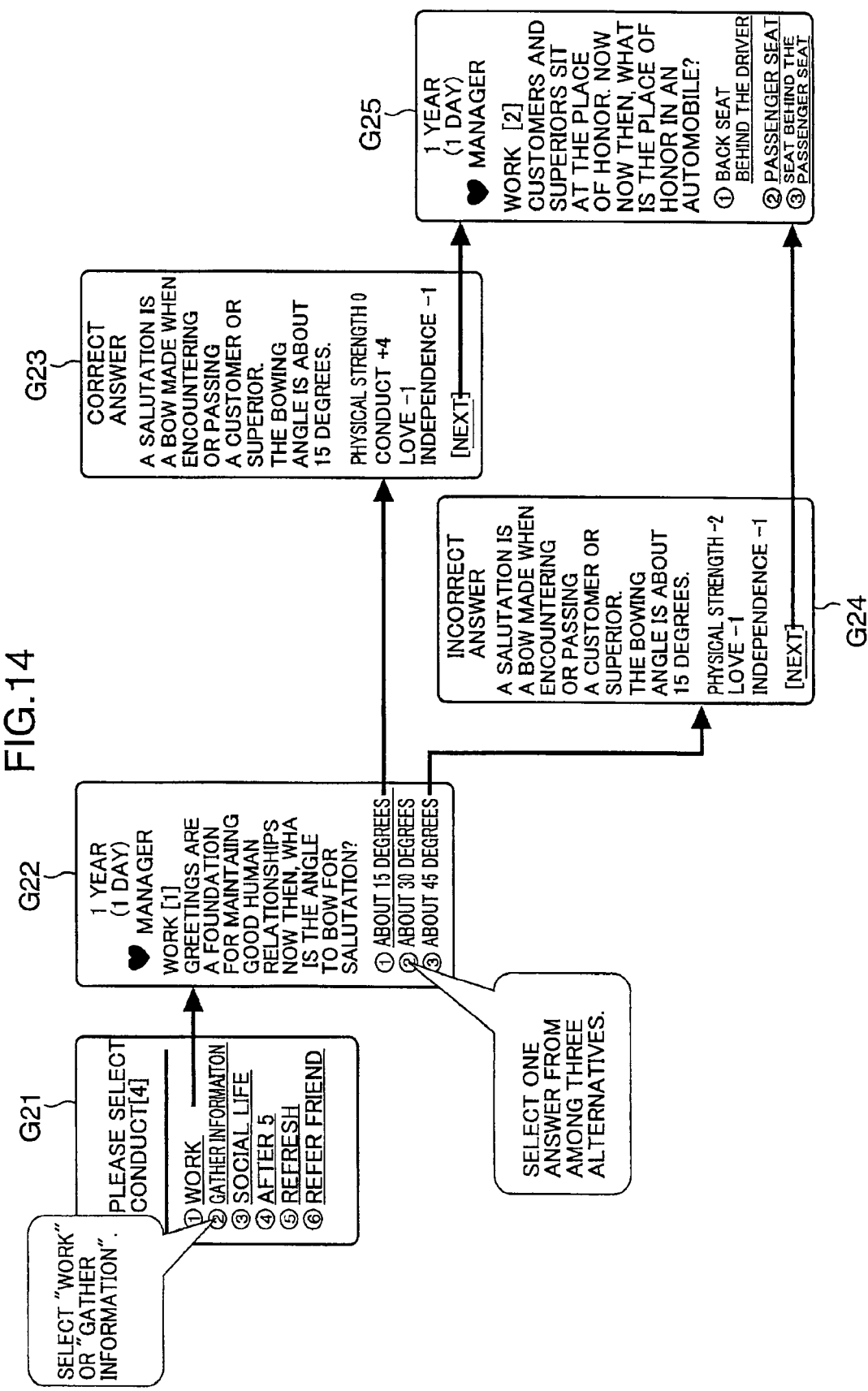
FIG. 14 is a screen shot showing game play when "(1) work" has been selected.

FIG. 14 is a screen shot showing game play when the question "(1) work" has been selected on the mode select screen. In this mode, questions posed relate mainly to business manners. In mode select screen G21, selecting "(1) work" leads to screen G22; in screen G22, the period since being hired, current position, and a heart mark which indicates a "physical strength" parameter (where the physical strength parameter value is 71–100 the display is as shown in screen G22; where the physical strength parameter value is 31–70, it is shown as a halved mark; and where the physical strength parameter value is 0–30, no mark is shown) are displayed at the top, and a question—in multiple-choice format for example—is shown at the bottom. The character-training process portion 102 receives a response from cell phone 3 and, on the basis of the table shown in FIG. 4A, determines increment/decrement parameters if the answer is correct, and indicates this on a commentary screen (screen G23) from the question generating portion 101. If the response is incorrect, the character-training process portion 102 determines increment/decrement parameters for an incorrect answer, and indicates this on a commentary screen (screen G24) from the question generating portion 101. The character-training process portion 102 adds (updates) the determined increment/decrement parameters to the corresponding current parameters in the data for the virtual individual associated with the cell phone 3. Next, a second question is posed (screen G25) and a similar response process is performed. Three questions are posed during each single access; these make up one question session.

If "(2) gather information" is selected from the mode select screen, game play is analogous to that with "(1) work". Here, questions posed relate mainly to business manners relating to current buzzwords. The character-training process portion 102 determines if responses from the cell phone 3 are correct or incorrect, and depending on the result determines parameter change values determined on the basis of the table shown in FIG. 4A and adds these to current parameters for the personal data. This "(1) work" and "(2) gather information" are designed to mainly be reflected in parameters for promotion.

Figure 15:
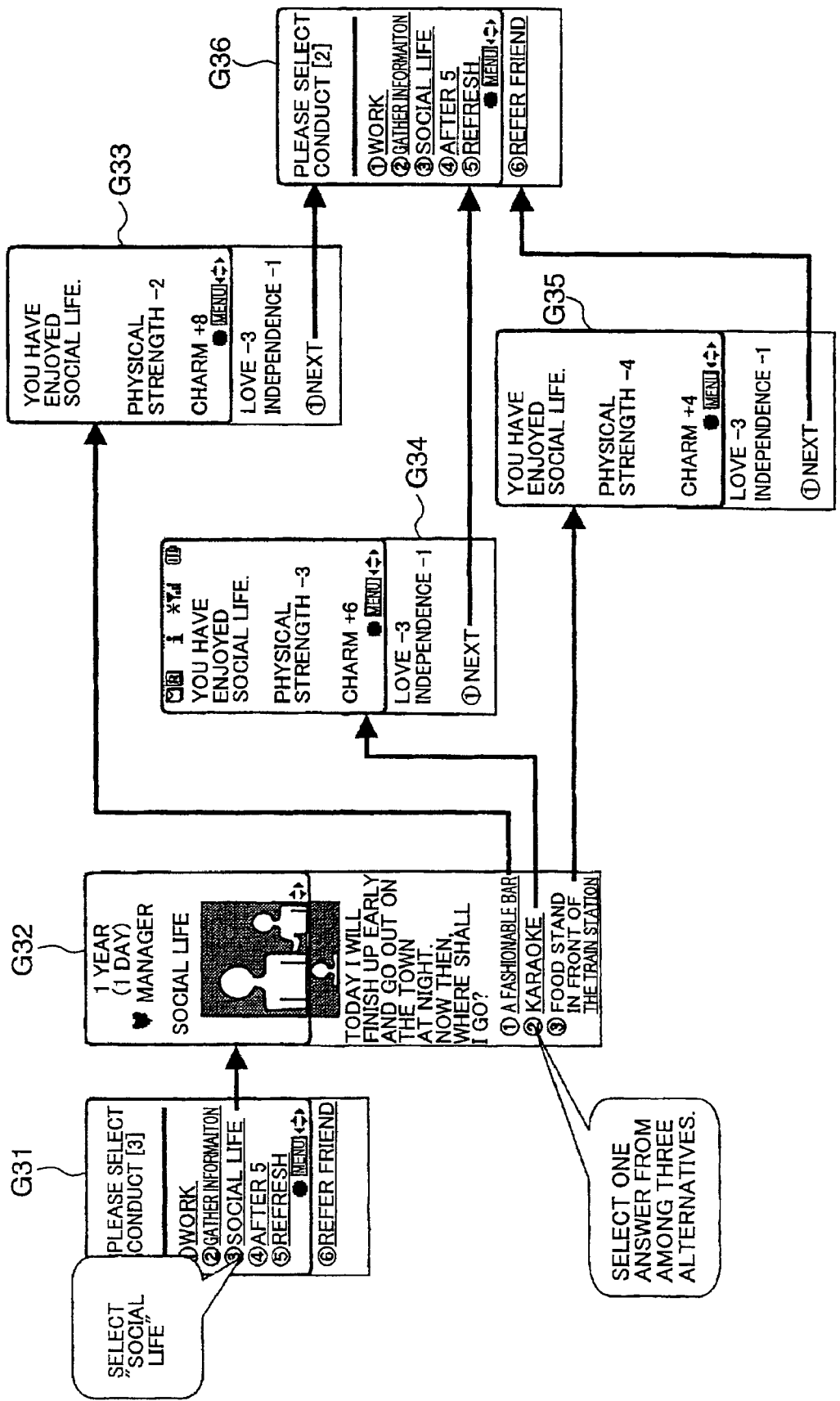
FIG. 15 is a screen shot showing game play procedure when "(3) social life" has been selected.

FIG. 15 is a screen shot showing game play procedure when "(3) social life" has been selected in mode select screen G31. In this mode there is one question, for example, relating to hobbies or interests, etc. and shown on question screen G32 as multiple-choice format. In the example of screen G32 there are three choices; depending on the selection branch selected, commentary is provided (in actual practice content is different for each) as shown in screens G33, G34 and G35, and increment/decrement parameters and values thereof are also indicated on the basis of the table shown in FIG. 4A. For each branch, prescribed values are set in a range which allows increment and decrement. The character-training process portion 102 adds the provided increment/decrement values to parameter values for personal data. Increment/decrement values can be incremented/decremented within the ranges shown in the table of FIG. 4A, and may be set randomly each time. The system then returns to mode select screen G36.

Figure 16:
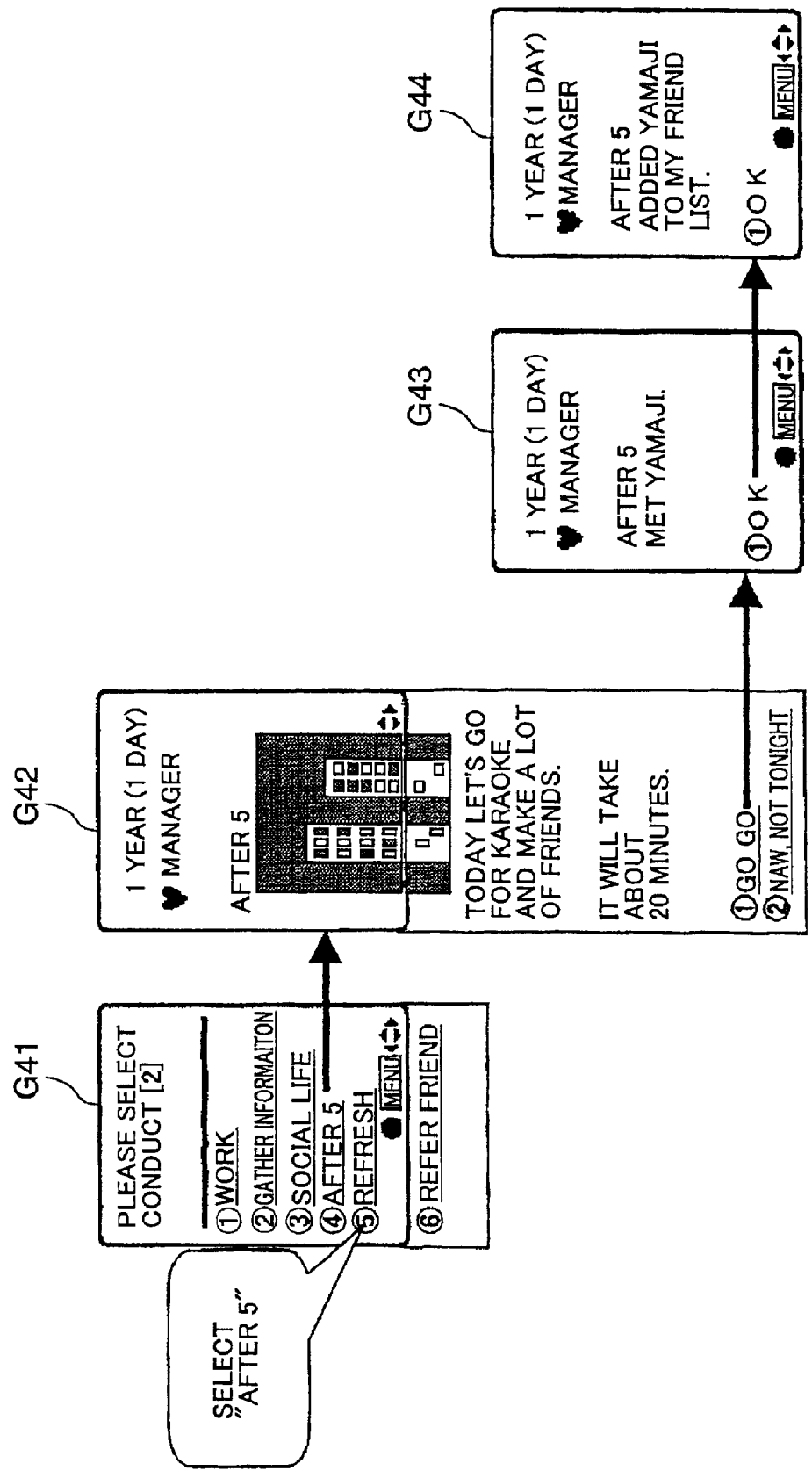
FIG. 16 is a screen shot showing game play procedure when "(4) after 5" has been selected.

FIG. 16 is a screen shot showing game play procedure when "(4) after 5" has been selected. When this mode is selected, the system moves randomly from screen G41 to, for example, a karaoke pub, movie theater, bar, restaurant, English conversation school or other game scene (screen G42), after which predetermined values are randomly set within the parameter increment/decrement ranges shown in table of FIG. 4A, or predetermined increment/decrement values are set for each game scene, and optionally displayed on the monitor, as well as being added to current parameters for personal data.

The game play processing portion 100, regardless of whether or not of the same virtual company (or within the same virtual company), determines if other virtual individuals are simultaneously present in the same game scene, and if present, always or randomly performs a process for becoming acquainted with one or a plurality of virtual individuals, i.e. displays to this effect on the monitor (screen G43), as well as adding information specifying the virtual individual(s) displayed on the monitor to the "friend list" or the virtual individual of personal data storage portion 112. Screen G44 notifies of addition of to the friend list.

As a process for making a friend, virtual individual mailboxes are provided for oneself and the friend on server 1. A similar display and process are done for the befriended individual. In each game scene, on the assumption that the virtual individual cannot be contacted until returning home (to a virtual home), the monitoring portion 103 monitors the time from a clock 1301 and prohibits access from the cell phone 3 of the virtual individual in question for a predetermined time interval (at least for within one day of the current time).

Figure 17:
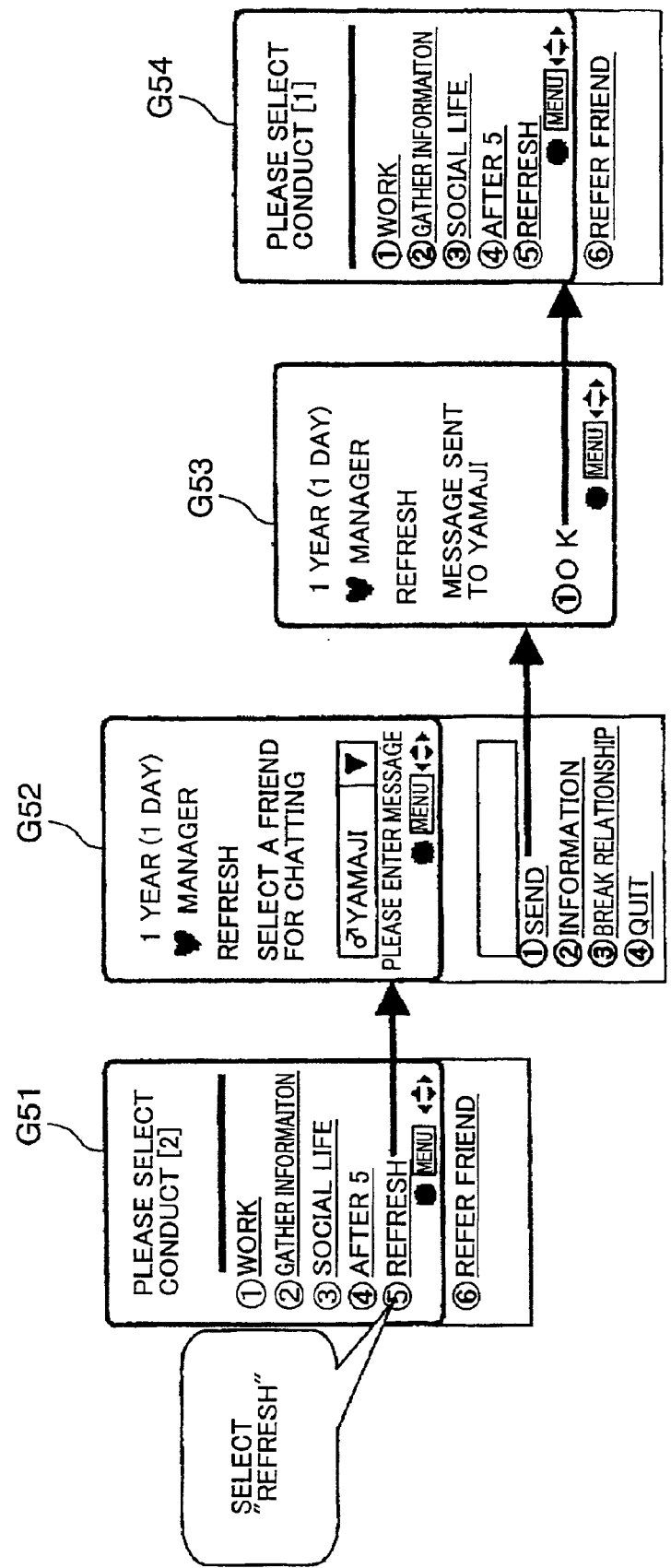
FIG. 17 is a screen shot showing game play procedure when "(5) refresh" has been selected.

FIG. 17 is a screen shot showing game play procedure when "(5) refresh" has been selected in mode select screen G51. In this mode, e-mails are sent with the aim of exchanging information with a friend acquired in "(4) after 5"; when this mode is selected, the monitor mode select screen G51 shows a friend and message input screen G52. Selectable content includes "(1) send", "(2) information", "(3) break off relationship", etc. Here, through menu operation inspection of one's own friend list is allowed, and it is allowed to enter the name of a desired friend therefrom, and also to input a message. After message input, when "(1) send", for example, is indicated, the game play processing portion 100 performs a process to deliver the mail to the mailbox of the recipient and displays to this effect on screen G53. Selecting OK returns one to the mode select screen G54.

In this way, information exchange with virtual individual friends is enabled via a mailbox. "(2) information" is a process for inspecting contents sent from others to one's own mailbox, at message input is not required at this time. "(3) break off relationship" is a process for deleting information for a friend with whom one wants to break off the relationship from "friend list" in one's own personal data; when the game play processing portion 100 receives a break off relationship instruction for the name of friend entered from screen G52, it deletes from "friend list" in the indicated personal data the information for the entered friend, as well as similarly deleting from the personal data for the deleted virtual individual data for the virtual individual who has instructed to break off the relationship. When this mode is selected, predetermined increment/decrement values are set for parameters indicated in the table in FIG. 4A, except for the "physical strength" parameter, and the "physical strength" parameter is randomly set within an increment/decrement range, or a preset increment/decrement value is set in response to selected content, and optionally displayed on the monitor, as well as being added to the current parameters for personal data.

In this way, processes "(1) work"—"5 refresh" are completed (STEP S14), and the results are updated in the personal data storage portion 112 of the database 11.

As an additional process performed by the character-training process portion 102, there may be provided a "switch job" mode among the selectable modes (not shown in FIG. 4A). In this mode, there is first displayed a screen for inputting the company one wishes to switch to; the president of the virtual company entered by the player is checked, it is checked whether [the player] is present in the president's "friend list", and if present, an unconditional job switch (i.e. without testing) process is performed. Optionally, a process to raise the position at the new company by one and to increase parameters to appropriate values may be added. The game play procedure for the selected mode "refer friend" will be described later.

In the present embodiment, game play processing portion 100, by way of checking the content of e-mails sent to the mailbox, is provided with a prohibiting (character check filter process) function for refusing input of inappropriate characters and terms. Since characters are processed through conversion to character codes, a list of prohibited character codes can be stored in memory, and character codes entered by a player checked, prohibiting entry of characters corresponding to matching codes, and informing the player to this effect. Alternatively, a process whereby after entry has been received, a check is performed to determined if prohibited characters are contained, and if contained, a display mode for notifying to this effect performed, and partial correction allowed through known "delete" and "insert" processes in character input. Besides characters, terms may be stored in the form of a list of combinations of a plurality of codes, and checked in similar fashion.

In this game, information conversion relating to mail addresses is prohibited, so input of terms or single-bytes required to indicate a mail address is prohibited. Also, there is also had a list of characters and terms for indicating current location name and date/time, and input thereof is prohibited. This assures that morality is maintained by players participating in the game and among players.

Next, in STEP ST15, it is determined whether the number of one-day modes has reached the fourth one, and if the forth one has not been completed, the system returns to STEP ST13 and enables a subsequent mode indication operation in the desired manner. If the fourth one has completed (yes in STEP ST15), a process for paying virtual salary is performed (STEP ST16), and upon completion of one month of service in virtual time, the balance in the money data portion of virtual individual data is updated. Players are notified of the details of virtual pay by a simulated pay stub distributed by e-mail.

Next, a determination is made as to whether the content of parameters of a virtual individual, stored in the parameter storage portion 114, have reached the promotion condition score shown in FIG. 18, and cleared the promotion condition (STEP ST17). The permission portion 104 reads current parameters acquired by the virtual individual and current position information from the personal data storage portion 112, calculates a score from current parameter values and if the computed score has not reached the promotion condition score, assumes that one month—in game time—has been completed (STEP ST18) and terminates the first access. If, on the other hand, the computed score has reached the promotion condition score, execution of a process for a promotion test is allowed and is executed (STEP ST19). Once the promotion test is completed, the game play processing portion 100 temporarily cuts the connection and distributes a pass/fail result from the server 1 after a predetermined time interval (STEP ST20).

As shown in FIG. 18, the promotion condition score, where the current position is, for example "manager", is when the total of the average value of the "intelligence" parameter value and the "conduct" parameter value, and 10% of the "fortune" parameter value is equal to 301 or above. In the promotion test, in the process of aiming to advance through seven levels from ordinary employee to president, during advancement up to department head, questions relating to business manners and current buzzwords are posed, whereas during advancement in the executive ranks from managing director to executive director, questions relating to management, etc. are posed. In the present embodiment, questions are posed in multiple choice format, but in order to avoid a loss of game interest due to the ability of players to discern a pattern for correctly answering questions, in promotion tests for advancement to the executive ranks, correct answer numbers corresponding to selection branch numbers for each question are varied randomly for each question. With this arrangement, by pre-associating correct responses and incorrect responses with questions, a correct response selection branch can be indicated even if selection branch numbers are modified.

Where current positions is "managing director" or "executive director", the chance for promotion to "president" is allowed; in this case the promotion condition score will be determined no through comparison of one's own parameter values with predetermined values, but by the relationship with parameter values for the current president one is aiming to replace, as described hereinbelow.

FIG. 19 is a screen shot of game play procedure during promotion testing at STEP ST19.

First, screen G61 is displayed, and the player is prompted to respond whether or not to take the promotion test. If "(2) not this time" is selected, the system goes through STEP ST20 and terminals this operation process. "(2) not this time" may be extended up to three times, and in this case the passing line in the next promotion test for the same position is lowered by a predetermined value to make promotion easier. On the other hand, if "(1) take the test" is selected, screen G62 is displayed and promotion test guidance is performed.

Here, when "(1) next" is selected, a first question, for example, as a question in multiple-choice format, is displayed as shown in screen G63. Here, when any selection branch is selected and a response entered, next, it is determined if 10 questions have been completed (STEP ST21). If 10 questions have not been completed, display of the order of the questions up to 10 is performed (STEP ST21). If 10 questions have been completed, completion of the promotion test is guided, and after a predetermined time interval—one hour in the present embodiment—there is displayed a message that the candidate will be notified of the pass/fail decision, and the connection is cut.

The character-training process portion 102, if the number of correct answers determined from the content of the responses to the 10 questions is above a certain number of questions, for example, all correct or 8 correct, determines a passing grade, and if not determines a failing grade, and modifies the appropriate parameters. In the event of a passing grade, the position is promoted by one rank; in the event of all correct answers, promotion by two ranks is possible. Besides the number of correct answers, the magnitude of the "fortune" parameter may be taken into consideration in the pass/fail decision. After one hour has elapsed since cutting the connection, the pass/fail decision result is distributed from the server 1 (STEP ST20). Screen G65 is an exemplary screen thereof, and is a distributed screen when the promotion test has been passed.

Appointment to president—the ultimate level of promotion—is constituted such that selection from among executives—including managing and executive directors—is performed through one-time selection at predetermined intervals—in the present embodiment, every week in actual time—by the character-training process portion 102, and at this time the opportunity to replace the president is presented. It is managed by the game play processing portion 100 such that the number of executives is 10% of the whole company. The character-training process portion 102, using as decision elements average values for parameter values of the evaluation target values of "intelligence", "conduct" and "charm", and the parameter values of "love" and "fortune", determines whether the values exceed values for the president, and if they do exceed performs a process for replacing the president. If the president is replaced, a name change function of the game play processing portion 100 confers permission to change the name of the virtual company for the new president and displays a new company name input screen (not shown). Company name change is optional (it may be changed or not); whether made or not, employees and executives—other than the new president—are sent mail under the original company name or new company name, to the effect that the president has been replaced.

As indicated in FIG. 4B, which shows the type of modes which are management modes of the virtual company by the president, descriptions thereof, and parameter increment/decrement ranges, the president's job duty modes, in contrast to the employee duty modes shown in FIG. 4A, include, in place of the "social life" employee duty mode, a promote/demote mode giving the president authority to promote and demote other employees, and meeting mode allowing him to summon employees.

FIG. 20 is a diagram showing game play procedure in "3. promote/demote" mode, as an example of a duty mode performed by the president.

If there is access from a cell phone 3 of a virtual individual, the game play processing portion 100 searches the personal data storage portion 112 and performs a determination from the unique verifying ID of the accessing cell phone 3 whether or not it is the president. If it is the president, a president duty mode selection screen G71 is displayed. When in response to this screen "3. promote/demote" is selected, a screen G72 for instructing "promote/demote" is displayed. From this screen, designation of a target employee can be made randomly, or through a manual operation by the player from an employee list viewable only by the player who is the president, as well as guiding input of comments, and receiving input of desired content, in this embodiment, content such as "rise quickly to management". Next, when "(1) promote" is instructed, the character-training process portion 102 designates the relevant virtual individual from the personal data storage portion 122 and sends to the cell phone 3 of the virtual individual screen information of message content indicating a pre-prepared commendation (STEP ST31), as well as displaying, as in screen G73, content to the effect that promotion and commendation have been sent to the employee, on the monitor of the president's cell phone 3. The character-training process portion 102, during completion of the process of this duty mode, executes a process to add the increment/decrement parameters shown in FIG. 4B to current parameter values. Parameters having increment/decrement ranges (e.g. the "fortune" parameter) are decided randomly, whereby the "promote/demote" mode is terminated.

FIG. 21 is a diagram showing game play procedure in "refer friend" mode, one exemplary employee, president job duty mode. This process, in contrast to the case of the other duty modes described above, is basically not limited as to number, but a limit may be provided if needed.

When a player selects "refer friend" in screen G21 (screen G71 in the case of the president), the game play processing portion 100 reads the enrollment guide screen from the enrollment-related information storage portion 116 and transmits it to the cell phone 3 of the player via the transmitting/receiving portion 105. In the input guide frame of screen G81 the player enters the referred friend's name, mail address, and an optional message (hereinafter termed referral information) according to a character input procedure using the keypad of the cell phone. The input content is displayed on screen G81, as well as being transferred to a back screen G82 as a form summarizing the input content; when confirmed from screen G81, back screen G82 is displayed. The player verifies the content of the display on screen G82, and if the content is correct, instructs it to be sent. The enrollment-related information generating portion 106, upon receiving the input content, reads a form—stored in enrollment-related information storage portion 116—that reports that a recommendation has been sent, and sends this back to the cell phone 3 of the player (screen G83). Here, indicating "0" returns it to the title screen (G21, G27). Recruiting is performed essentially right after the post-recommend friend process, it may be performed after a predetermined time interval or at periodic time intervals, for example.

FIG. 22 is a diagram showing game play procedure for solicitation. The enrollment-related information generating portion 106 extracts from personal data storage portion 112 the referring person's name, virtual company, position etc. in the previously received referral information, and generates a solicitation screen G91 comprising solicitation information, which is sent to the mail address of the recommended person via the transmitting/receiving portion 105. This screen G91 solicits participation in the game, and the text thereof includes the referring individual, virtual company to which he or she belongs, and position, as well as the name of the recommended individual, and a URL address in server 10 for jumping to the game. By entering this URL one may jump to the game by means of the enrollment process portion 107, and display of screen G92 is performed. Further, by selecting "wish to apply" in screen G92 it proceeds to the game introductory screen (screen G1). In this way, by linking the recruiting screen G91 and game URL address, it becomes easy to go to the game introductory screen (screen G1). By including referring individual information in the recruiting screen G91, the referred individual can easily determine who has made the referral.

When a referred individual indicates intent to apply for the job and subsequently passes a predetermined admission test, the advantage conferring portion 108 calculates, on the basis of the table in FIG. 4A (or FIG. 4B) 10% of parameter values for the virtual individual who is the recommending player. Specifically, advantage process portion 109 calculates 10% of the values of the attribute parameter values of the corresponding personal data, and adds the results of the calculations to the corresponding parameter values. Or, current parameters may be updated by multiplying each by a factor of 1.1. In this way, by means of "refer friend" mode, one's own parameters may be upped. The advantage is not limited to %; as in duty mode, numerical values are acceptable as well.

Since the virtual company of the referring individual is displayed on input solicitation screen G91, for a new player desiring to join a company, preferred practice is to perform an order switching process—by means of enrollment process portion 108 (or game play processing portion 100) so that in a list display of occupations and virtual company names (shown in FIGS. 8 and 9) the occupation and virtual company name of the referrer are placed at the top of the list. At the time of hiring by the same company as the referrer, the advantage conferring portion 108 ups by a predetermined percentage greater than 10%.

FIG. 23 is a diagram showing the procedure for notifying a referrer (player) that a friend has been hired. When a referred individual indicates intent to apply for the job and subsequently passes a predetermined admission test, the report generating portion 109 generates a report like that shown in screen G101, and transmits it to the cell phone 3 of the recommending player via the transmitting/receiving portion 105. In screen G101, the total number of pages of the report are displayed on the second line, below which is shown the number of the current page. By selecting "read", one moves to screen G102, the report of the current page number is displayed, here, the new employee introduction screen. In screen G91, the name is "Yoshitsugu", but at the time of enrollment it is determined that the name has been registered as "Yoshipy." Selecting "next" moves one to the screen G1 title screen.

Returning to screen G101, "business card folder 3/15" indicates that where friends can be guaranteed up to a maximum of 15 cards, currently the third individual is displayed. Directly below is a field in the displaying the name of the current, i.e., third individual. Further, "(1) report" below means to send mail to the player whose name is currently displayed, and "(2) view business card" means to view personal information (virtual company name, position, and other content similar to that of an actual business card), and "(3) discard business card" means to break the relationship with the currently displayed friend.

The server 1 statistically evaluates personal data relating to all virtual individuals, especially parameter values acquired by each virtual individual, executes an evaluation for each virtual company, and creates a ranking for all companies. This information is provided upon request from a player.

In the present embodiment, the target players are mainly unemployed students and members of society, and through the game it is possible to acquire as useful information the content of promotion tests such as businessman aptitude tests and business manners. In order to promote a desire to continue the game, there may be provided a function whereby rewards—such as music that can be used as a ringer sound for the player's cell phone 3, or images (so-called wallpaper)—can be distributed to players who have succeeded in advancing.

In the present embodiment, as shown in FIG. 1, cell phones 3 with data transmission capability are used as the data terminals used by players, but it would be possible to use as a data terminal a portable data terminal (PDA) 31, or a data terminal 3' of a different model, and capable of data transmission via a different provider 3B.

Further, where a president is still in office upon retirement (in actual time, 60 days from the hire date), the game play processing portion 100 stores the president's name in past president storage portion. If a virtual employee so desires, or by selecting as a mode a mode wherein one goes to the president's office, it is possible to view stored personal data for past presidents.

"Refer friend" mode is not limited to the character-training game of the present embodiment, and is implementable in net games of various kinds. Examples are war games, quiz games, etc. utilizing a network. Each game has an establish game object, and players compete with the aim of achieving that object; this "refer friend" mode, by conferring advantages useful in achieving the goal of the game when recruitment has been successful, provides game play from a wider viewpoint and expands the scope of application.

In "refer friend" game mode, the design may be such that a predetermined admission test is passed.

In summary, the present invention relates to a net game system for playing a game with the aim of achieving a predetermined goal of the game, said game being played, via monitor-equipped data terminals operated by member players, in a game space provided on a game server, while in communication with the game server on a network, said system comprising: recruiting generating means for generating recruiting, said information including information specifying a member player, in the event that said game server receives from said member player referral information specifying the mail address of the data terminal of a non-member player; enrollment processing means for performing enrollment processing upon receiving job application information from said non-member player in response to recruiting information sent to the mail address of said non-member; and advantage conferring means for conferring to the referring member player advantages useful in achieving the goal of said game in the game.

The invention also relates to a processing method for a net game for playing a game with the aim of achieving a predetermined goal of the game, said game being played, via monitor-equipped data terminals operated by member players, in a game space provided on a game server, while in communication with the game server on a network, said method comprising the steps of: generating recruiting information, said information including information specifying a member player, in the event that said game server receives from said member player referral information specifying the mail address of the data terminal of a non-member player; performing enrollment processing upon receiving job application information from said non-member player in response to the recruiting information sent to the mail address of said non-member; and conferring to the referring member player advantages useful in achieving the goal of said game in the game.

In addition, the present invention also relates to a computer-readable storage medium for storing a net game play processing program for playing a game with the aim of achieving a predetermined goal of the game, said game being played, via monitor-equipped data terminals operated by member players, in a game space provided on a game server, while in communication with the game server on a network, comprising the steps of: generating recruiting information, said information including information specifying a member player, in the event that said game server receives from said member player referral information specifying the mail address of the data terminal of a non-member player; performing enrollment processing upon receiving job application information from said non-member player in response to recruiting information sent to the mail address of said non-member; and conferring to the referring member player advantages useful in achieving the goal of said game in the game.

According to the inventions recited in the above, there is provided a referral mode for recruiting non-members, by way of a means for achieving the goal of the game, and member players who provide referrals are conferred advantages useful in achieving the goal of the game during the game, whereby the number of members may be increased efficiently.

In the aforementioned net game system, referral information may include the mail address of the data terminal of a non-member. In addition, in the aforementioned processing method for a net game, the referral information also may include the mail address of the data terminal of a non-member. Similarly, in the computer-readable storage medium for storing a net game play program, wherein the referral information may include the mail address of the data terminal of a non-member. With these arrangements, mail addresses are included for non-members who are not participating in the game at all. According to the inventions with the aforementioned features, mail addresses are included for all non-members not participating in the game whatsoever.

In the aforementioned net game system, it may further comprise report generating means for generating a report informing the referring member player that the non-member referred by him or her has been hired. In addition, in the aforementioned net game system, the report informing that the non-member referred by him or her has been hired can be generated and sent to the referring member player. Moreover, in the aforementioned computer-readable storage medium for storing a net game play program, a report informing that the non-member referred by him or her has been hired can be generated and sent to the referring member player. With these arrangements, a report informing that a referred non-member has been hired is generated, and the report is sent to the referring member player, thereby notifying him or her that enrollment has occurred. According to the inventions with the above features, there is performed generation of a report notifying that a referred non-member has been hired, and this report is sent to the referring employee player, informing him or her of the admission.

In the net game system, the goal of the game can be for a score accumulated in the course of game play to reach a predetermined value, and the advantage conferring means may add a predetermined score to the member player. In addition, in the aforementioned net game system, the goal of the game can also be for a score accumulated in the course of game play to reach a predetermined value, and the useful advantage can be addition of a predetermined score to the member player. Moreover, in the aforementioned computer-readable storage medium for storing a net game play program, the goal of the game can be for a score accumulated in the course of game play to reach a predetermined value, and the useful advantage can be an addition of a predetermined score to the member player. With these arrangements, as the goal of the game is for a score accumulated in the course of game play to reach a predetermined value, the useful advantage is addition of a predetermined score to the member player. According to the inventions with the above features, as the object of the game is for the cumulative score to reach a predetermined value in the course of game play, the advantage conferred to referring players is addition of a predetermined score.

In the aforementioned net game system, the game space on the game server may be a virtual "company", and the game may be a character-training game in which virtual "employees" associated with data terminals train character by aiming at becoming president of the virtual company. With this arrangement, players can, through the game, experience simulated social lessons, for example, company duties. According to the invention with the above feature, players can, through the game, experience simulated social lessons, for example, company duties.

In the aforementioned network game system, the game server may comprise question generating means for generating a predetermined number of question sessions, said sessions being shown at predetermined intervals on data terminal monitors; transmitting/receiving means for transmitting a generated question to a data terminal and for receiving from a data terminal response data in response to the question shown on the data terminal monitor; a parameter storage portion for storing said response data together with an associated increment/decrement parameter value required for character-training; a personal data storage portion for storing a parameter value updatable with reference to information that identifies an employee; and character-training processing means for adding the increment/decrement parameter value to a current parameter value, said value having been determined from the content of response data to a question, storing in said personal data storage portion a value for the virtual employee, and on the basis of this parameter value, performing a process to promote or demote within the virtual company the virtual employee associated with said data terminal.

With the above arrangement, answers are stored together in association with predetermined increment/decrement parameter values required for character-training, whereupon a predetermined number question sessions to be shown at predetermined intervals on data terminal monitors are generated; the generated question is transmitted to the data terminals, and response data sent from the data terminals in response to the question shown on the data terminal monitors is received. Increment/decrement parameter values—these are determined from the content of response data for questions—are added to current parameter values and stored in the personal data storage portion as values for individual virtual employees; when cumulative parameter values go above predetermined values, a process is performed to promote or demote the virtual employee, thus providing interest to the character-training game. According to the invention with the above feature, processes are performed to promote or demote virtual employees within virtual company, thus providing interest to the character-training game.

The aforementioned net game system may further comprise game play processing means allowing a player to select any of a plurality of game modes, wherein said parameter storage portion has increment/decrement parameter value settings for the different game modes. With this arrangement, acquired parameter values vary with the selected game mode, providing more variation in the character-training game. According to the invention with the above feature, acquired parameter values vary with the selected game mode, providing more variation in the character-training game.

In the aforementioned net game system, said question generating means may be accessed from a data terminal to pose a predetermined question. With this arrangement, a player's data terminal is posed with a question when accessed by the player. With this system, the access history of a player per se can serve as a factor in promotion. According to the above feature, a player's data terminal is posed with a question when accessed by the player. With this system, the access history of a player per se can serve as a factor in promotion.

This application is based on Japanese Patent Application Serial No. 2000-341367 filed in Japanese Patent Office on Nov. 9, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A network game system for playing a game with the aim of achieving a predetermined goal of the game, said game being played, via monitor-equipped data terminals operated by member players, in a game space simulating a virtual company provided on a game server, while in communication with the game server on a network, said system comprising:

question generating means for generating questions as an employment test in response to access from the monitor-equipped data terminal of a non-member player, transmitting/receiving means for transmitting and receiving data to and from the monitor-equipped data terminals including transmitting the questions generated by the question generating means to the monitor-equipped data terminal of the non-member player via the network and receiving information from the non-member player in response to the questions via the network;

character-training process means for evaluating if the non-member player is qualified as an employee of the virtual company based on the information sent back by the non-member player via the network;

recruiting information generating means for generating, upon receipt from a member player of referral information specifying a mail address of a data terminal of a non-member player, recruiting information including information specifying the member player, the recruiting information being sent to the non-member player via the transmitting/receiving means;

enrollment processing means for performing enrollment processing upon receiving application information from the non-member player depending on whether the application information is received from the non-member player in response to the recruiting information sent to the mail address of said non-member player, the enrollment processing means being arranged to consider the employment test passed only upon receipt of application information from a non-member player in response to the recruiting information sent to the mail address of the non-member and, when the non-member player provides application information not in response to recruiting information, the enrollment processing means performing enrollment processing with the employment test and determining whether the non-member player passes or fails the employment test; and advantage conferring means for conferring to the referring member player advantage useful in achieving the goal in the game.

2. The network game system according to claim 1, further comprising report generating means for generating a report informing the referring member player that the non-member referred by him or her has enrolled.

3. The network game system according to claim 1, wherein the goal of said game is for a score representing a number of points accumulated in the course of game play to reach a predetermined value, and said advantage conferring means adds a predetermined number of points to the member player's score.

4. The network game system according to claim 1, wherein the game space claim 1, wherein said game is a character-training game in which virtual employees associated with data terminals are trained, aiming at becoming president of said virtual company.

5. The network game system according to claim 4, wherein said game server comprises:

question generating means for generating a predetermined number question sessions, said sessions being shown at predetermined intervals on data terminal monitors;

transmitting/receiving means for transmitting a generated question to a data terminal and for receiving from a data terminal response data in response to the question shown on the data terminal monitor;

a parameter storage portion for storing said response data in association with an increment/decrement parameter value required for character-training;

a personal data storage portion for storing at least a parameter value updatable with reference to information that identifies an employee; and character-training processing means for adding to a current parameter value said increment/decrement parameter value determined from the content of response data to a question, storing the result in said personal data storage portion for each virtual employee, and on the basis of this parameter value, performing a process to promote or demote within the virtual company the virtual employee associated with said data terminal.

6. The network game system according to claim 5, further comprising game play processing means allowing a player to select any of a plurality of game modes, wherein said parameter storage portion has increment/decrement parameter values set for the respective different game modes.

7. The network game system according to claim 4, said question generating means poses a predetermined question when accessed from a data terminal.

8. The network game system according to claim 1, wherein the referral information includes a message from the member-player to the non-member player and the recruiting information includes the message.

9. The network game system accord to claim 1, wherein the recruiting information generating means are arranged to generate recruiting information including the member player's virtual company and position.

10. The network game system according to claim 1, wherein the recruiting information generating means are arranged to generate recruiting information including a URL address for jumping to the network game system.

11. A network game system for playing a game with the aim of achieving a predetermined goal of the game, said game being played, via monitor-equipped data terminals operated by member players, in a game space simulating a virtual company provided on a game server, while in communication with the game server on a network, said system comprising:

a company data storage portion for storing data relating to a plurality of virtual companies;

transmitting/receiving means for transmitting data from the game server to the monitor-equipped data terminal of a non-member player via the network;

a game play processing portion for reading the company data from the company data storage portion and transmitting the data to the monitor-equipped data terminal of the non-member player and allowing a selection of one of the companies by the non-member player;

recruiting information generating means for generating, upon receipt from a member player of referral information specifying a mail address of a data terminal of a non-member player, recruiting information including information specifying the member player, the recruiting information being sent to the non-member player via the transmitting/receiving means;

enrollment processing means for performing enrollment processing upon receiving application information from the non-member player in response to the recruiting information sent to the mail address of the non-member player;

advantage conferring means for conferring to the referring member player advantages useful in achieving the goal in the game; and question generating means for generating questions as an employment test in response to access from the monitor-equipped data terminal of a non-member player, the enrollment processing means being arranged to perform enrollment processing upon receiving application information from the non-member player depending on whether the application information is received from the non-member player in response to tho recruiting information sent to the mail address of said non-member player, said enrollment processing being to consider the employment test passed only upon receipt of application information from a non-member player in response to recruiting information sent to the mail address of the non-member and, when the non-member player provides application information not in response to recruiting information, the enrollment processing means being arranged to perform enrollment processing with the employment test and determine whether the non-member player passes or fails the employment test.

12. The game system according to claim 11, wherein the company data storage portion stores a plurality of virtual company data comprising various categories of businesses and includes as virtual company data, the name of the president, total assets, number of employees and ratings indicating a popularity index and trust.

13. A network game play processing method for proceeding a game with the aim of achieving a predetermined goal of the game, said game being played, via monitor-equipped data terminals operated by member players, in a game space simulating a virtual company provided on a game server, while in communication with said game server on a network, said method comprising the steps of:

generating questions as an employment test in response to access from the monitor-equipped data terminal of a non-member player;

transmitting the generated questions to the monitor-equipped data terminal of the non-member player via the network;

receiving information from the non-member player in response to the questions via the network;

evaluating if the non-member player is qualified as an employee of the virtual company based on the information sent back by the non-member player via the network;

generating recruiting information including information specifying a member player, in the event that said game server receives from said member player referral information specifying a mail address of a data terminal of a non-member player;

transmitting the recruiting information to the non-member player;

performing enrollment processing upon receiving application information from the non-member player depending on whether the application information is received from the non-member player in response to the recruiting information sent to the mail address of the non-member player, said enrollment processing step comprising the steps of considering the employment test passed only upon receipt of application information from a non-member player in response to the recruiting information sent to the mail address of the non-member and performing enrollment processing with the employment test when the non-member player provides application information not in response to recruiting information to determine whether the non-member player passes or fails the employment test; and conferring to the referring member player advantages useful in achieving the goal in the game.

14. The network game play processing method according to claim 13, wherein a report informing the referring member player that a non-member referred by him or her has enrolled is generated and sent to the referring member player.

15. The network game play processing method according to claim 13, wherein the goal of said game is for a score presenting a number of points accumulated in the course of game play to reach a predetermined value, and said useful advantage is the addition of a predetermined number of points to the member player's score.

16. A computer-readable storage medium for storing a network game play processing program for playing a game with the aim of achieving a predetermined goal of the game, said game being played, via monitor-equipped data terminals operated by member players, in a game space simulating a virtual company provided on a game server, while in communication with said game server on a network, said network game play processing program comprising the steps of:

generating questions as an employment test in response to access from the monitor-equipped data terminal of a non-member player;

transmitting the generated questions to the monitor-equipped data terminal of the non-member player via the network;

receiving information from the non-member player in response to the questions via the network;

evaluating if the non-member player is qualified as an employee of the virtual company based on the information sent back by the non-member player via the network;

generating recruiting information including information specifying a member player, in the event that said game server receives from said member player referral information specifying the mail address of the data terminal of a non-member player;

transmitting the recruiting information to the non-member player;

performing different enrollment processing upon receiving application information from the non-member player depending on whether the application information is received from the non-member player in response to the recruiting information sent to the mail address of the non-member player, said enrollment processing step comprising the steps of considering the employment test passed only upon receipt of application information from a non-member player in response to the recruiting information sent to the mail address of the non-member and performing enrollment processing with the employment test when the non-member player provides application information not in response to recruiting information to determine whether the non-member player passes or fails the employment test; and conferring to die referring member player advantages useful in achieving the goal in the game.

17. The computer-readable storage medium for storing a network game play program according to claim 16, where a report informing the referring member player that a non-member referred by or her has enrolled is generated and sent to the referring member player.

18. The computer-readable storage medium for storing a network game play program according to claim 16, wherein the goal of said game is for a score representing a number of points accumulated in the course of game play to reach a predetermined value, and said useful advantage is the addition of a predetermined number of points to the member player's score.

* * * * *